(12) United States Patent
Ben-Yehezkel et al.

(10) Patent No.: US 12,556,409 B2
(45) Date of Patent: Feb. 17, 2026

(54) SELF-SIGNED CERTIFICATE

(71) Applicant: TEXAS INSTRUMENTS INCORPORATED, Dallas, TX (US)

(72) Inventors: Yoav Ben-Yehezkel, Netanya (IL); Yaron Alpert, Hod Hasharon (IL)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 431 days.

(21) Appl. No.: 18/336,229

(22) Filed: Jun. 16, 2023

(65) Prior Publication Data

US 2024/0243925 A1 Jul. 18, 2024

Related U.S. Application Data

(60) Provisional application No. 63/438,891, filed on Jan. 13, 2023.

(51) Int. Cl.
*H04L 9/32* (2006.01)
*H04L 9/08* (2006.01)

(52) U.S. Cl.
CPC .......... *H04L 9/3263* (2013.01); *H04L 9/0866* (2013.01); *H04L 9/3236* (2013.01); *H04L 9/3247* (2013.01)

(58) Field of Classification Search
CPC ... H04L 9/3263; H04L 9/0856; H04L 9/3236; H04L 9/3247
See application file for complete search history.

(56) References Cited

U.S. PATENT DOCUMENTS

| | | | |
|---|---|---|---|
| 7,549,048 B2 | 6/2009 | Freeman et al. | |
| 7,568,114 B1 | 7/2009 | Schlafly | |
| 9,455,932 B2 | 9/2016 | Phillips et al. | |
| 10,728,044 B1 * | 7/2020 | Melo | H04L 9/0825 |
| 10,764,067 B2 | 9/2020 | Lewison et al. | |
| 10,841,295 B1 | 11/2020 | Pecen et al. | |
| 11,025,407 B2 | 6/2021 | Kaliski, Jr. | |
| 12,177,367 B1 * | 12/2024 | Creek | H04L 9/3247 |
| 2008/0052772 A1 * | 2/2008 | Conrado | G06F 21/6254 726/10 |
| 2017/0026177 A1 * | 1/2017 | Pilcher | H04L 9/0825 |
| 2024/0072999 A1 * | 2/2024 | Liu | H04L 9/3268 |
| 2024/0333695 A1 * | 10/2024 | Stolbikov | H04L 9/3263 |

\* cited by examiner

*Primary Examiner* — Hee K Song
(74) *Attorney, Agent, or Firm* — Carl G. Peterson; Frank D. Cimino

(57) ABSTRACT

A non-transitory machine-readable medium includes machine-readable instructions for a key value generator and a certificate generator. The key value generator is executable by a processor core to concatenate a public key of a certificate issuer with a second value to form a key combination and generate a digest of the key combination to provide a key value. The certificate generator is executable by the processor core to provide a payload of a self-signed certificate for the certificate issuer, replace data in a public key field of the payload with the key value, sign the modified payload with a private key of the certificate issuer to provide a digital signature, remove the key value from the modified payload, and add the digital signature to the self-signed certificate.

20 Claims, 14 Drawing Sheets

SELF-SIGNED CERTIFICATE

CROSS-REFERENCE TO RELATED APPLICATION

This application claims the benefit of priority to U.S. Provisional Application No. 63/438,891, filed on 13 Jan. 2023 the entirety of which is herein incorporated by reference.

TECHNICAL FIELD

The present disclosure relates to self-signed certificates. More particularly, this disclosure relates to a system and method for generating and authenticating a self-signed certificate.

BACKGROUND

In cryptography, X.509 is an International Telecommunication Union (ITU) standard defining the format of self-signed certificates. X.509 certificates are used in many Internet protocols, including transport layer security/secure socket layer (TLS/SSL), which is the basis for the hypertext transfer protocol secure (HTTPS), the secure protocol for browsing the web. X.509 certificates are also used in offline applications, like electronic signatures.

An X.509 self-signed certificate is created and signed by the same entity, usually an individual or an organization. X.509 certificates are a widely used standard for public key infrastructure (PKI), which is a system that enables secure communication over the Internet. The self-signed certificate contains information about the entity that created the self-signed certificate, such as the entity's name and public key, as well as the digital signature used to validate the certificate. When another entity (e.g., an application operating on an external system) communicates with a system that uses an X.509 self-signed certificate, this other entity can verify the authenticity of the certificate by checking its digital signature.

A digital signature is a mathematical scheme for verifying the authenticity of digital messages or documents. A valid digital signature, where the prerequisites are satisfied, gives a recipient very high confidence that the message was created by a known sender (authenticity), and that the message was not altered in transit (integrity). Digital signatures employ asymmetric cryptography. In some examples, digital signatures provide a layer of validation and security to messages sent through a non-secure channel.

A cryptographic hash function, or more simply, a hash function is any function that is employable to map data of arbitrary size to fixed-size values. The values returned by a hash function are called hash values, hash codes, digests, or simply hashes. The values are usually used to index a fixed-size table called a hash table.

SUMMARY

A first example is related to a non-transitory machine-readable medium including machine-readable instructions including: a key value generator. The machine-readable instructions for the key value generator are executable by a processor core to perform operations including: concatenating a public key of a certificate issuer with a second value to form a key combination and generating a digest of the key combination to provide a key value. The machine-readable instructions also include a certificate generator. The machine-readable instructions for the certificate generator being executable by the processor core to perform operations including: providing a payload of a self-signed certificate for the certificate issuer that includes the public key of the certificate issuer and replacing data in a public key field of the payload of the self-signed certificate with the key value to provide a modified payload. The machine-readable instructions for the certificate generator also include signing the modified payload with a private key of the certificate issuer to provide a digital signature, removing, responsive to the signing, the key value from the modified payload of the self-signed certificate and adding the digital signature to the self-signed certificate.

A second example is related to a non-transitory machine-readable medium including machine-readable instructions including a certificate authenticator, the machine-readable instructions for the certificate authenticator being executable by a processor core to perform operations including: receiving a self-signed certificate that includes a signature of a certificate issuer, extracting, from the self-signed certificate, the signature of the certificate issuer, generating a key value based on a corresponding public key and adding the key value to a public key field of a payload of the self-signed certificate to provide a modified payload. The machine-readable instructions for the certificate authenticator also include verifying the signature of the certificate issuer including the modified payload using the public key and selecting the public key as the public key for the certificate issuer responsive to the signature being authenticated by the verifying.

A third example relates to a system including: a non-transitory memory having machine-readable instructions and a processor core configured to access the non-transitory memory and execute the machine-readable instructions. The machine-readable instructions including a certificate authenticator, the processor core executing the machine-readable instructions for the certificate authenticator to perform operations including: receiving a self-signed certificate that includes a signature of a certificate issuer, extracting, from a payload of the self-signed certificate, the signature of the certificate issuer and generating a key value based on a corresponding public key. The machine-readable instructions for the certificate authenticator also include adding the key value to a public key field of the payload to provide a modified payload, verifying the signature of the certificate issuer including the modified payload using the public key and selecting the public key retrieved as the public key for the certificate issuer responsive to the signature being authenticated by the verifying.

DETAILED DESCRIPTION

Figure 1:
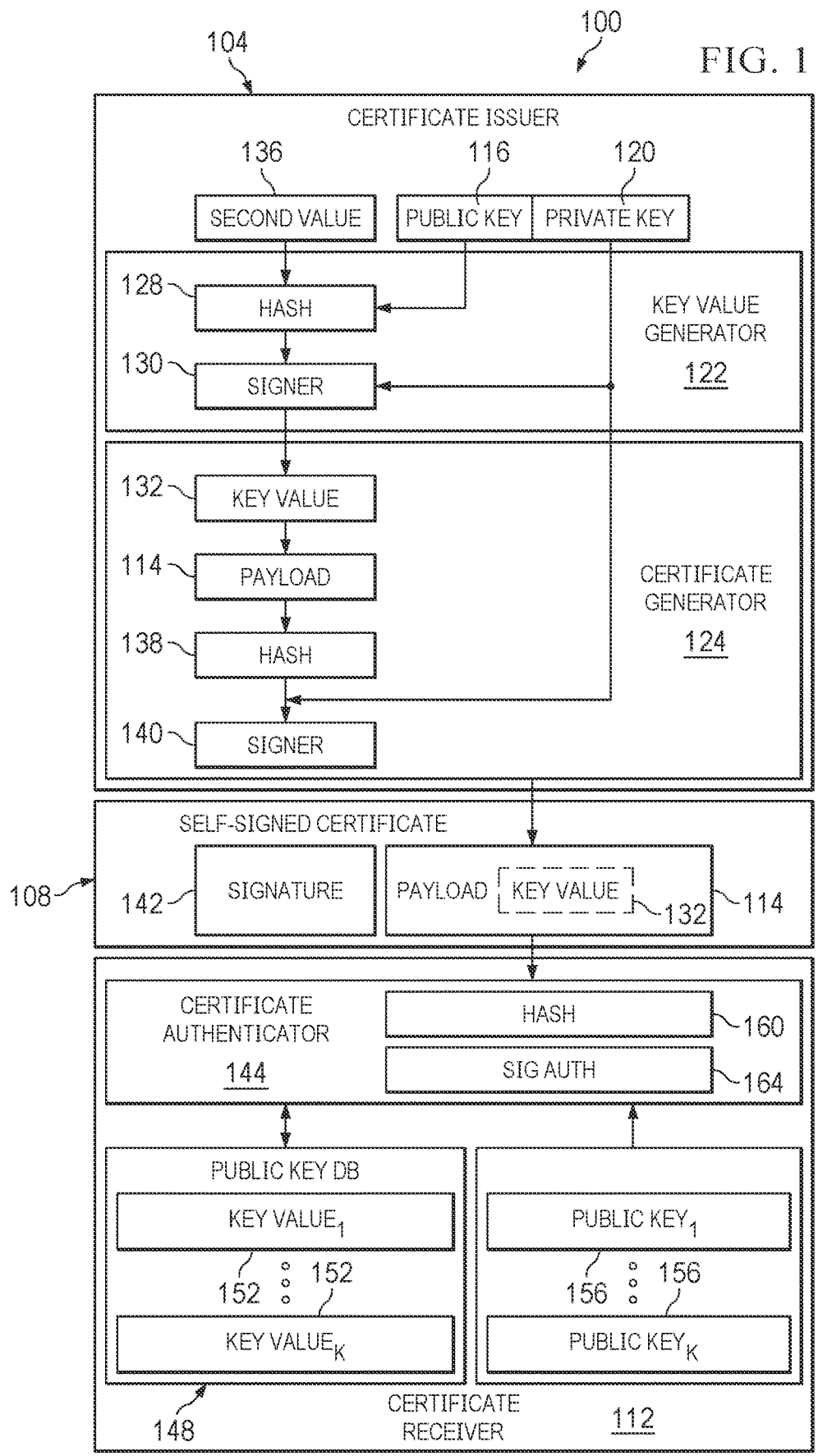
FIG. 1 illustrates a system for generating and authenticating a self-signed certificate.

This description is related to generating and authenticating a self-signed certificate. The self-signed certificate is generated in a standalone operation by a certificate issuer and received by a certificate receiver. The certificate issuer generates a payload for the self-signed certificate, and the payload may include a key value. The key value represents a digest or a signed digest of a key combination. The key combination includes a public key of a public-private key pair of the certificate issuer. In some examples, the key combination represents a concatenation of the public key and a second value (or multiple second values). These second values can include a nonce value (or multiple nonce values) or a hashed metadata (HMD) of the certificate receiver. In other examples, the key value is a digest or a signed digest of the public key. To generate the key value, the certificate issuer employs a hash function (alternatively referred to as a hash algorithm or simply a hash) on the key combination (or the public key) to provide the digest of the key combination (or the public key) as the key value. In some examples, the certificate issuer employs the private key of the certificate issuer to sign (digitally sign) the digest of the key combination (or the public key) to form a signed digest as the key value.

The self-signed certificate includes a payload with data fields, including a public key field. Conventionally, the public key field includes the public key (in clear text) of the certificate issuer. The certificate issuer replaces data in the public key field with the key value to provide a modified payload for the self-signed certificate. The certificate issuer employs a hash function on the modified payload to provide a digest of the payload. Additionally, the certificate issuer digitally signs the digest of the modified payload to provide a signature for the self-signed certificate.

In some examples, responsive to generating the signature, the certificate issuer removes the key value from the key value field of the modified payload of the self-signed certificate. Also, the certificate issuer adds the signature of the self-signed certificate. In this manner, the signature of the payload reflects the presence of the key value, even though the key value is removed or otherwise excluded from the self-signed certificate. In other examples, the key value remains in the key value field of the self-signed certificate. The resultant self-signed certificate is provided to the certificate receiver.

The certificate receiver receives the self-signed certificate and extracts a public key validation section that includes the signature of the self-signed certificate. The certificate receiver includes the public key for the certificate issuer stored in a data store, such as a public key database. The certificate receiver generates a selected key value based on a corresponding selected public key. In some examples, records in the public key database are preloaded (e.g., in a secure environment). In other examples, the certificate receiver populates the public key database with hash elements of key values that includes the public keys stored at the certificate receiver and possibly a second value. In various examples, the second value can be a nonce value (or multiple nonce values), HMD values or a combination thereof. In still other examples, the certificate receiver generates the key value on the fly (e.g., in real-time) using a hash function and (in some examples) the corresponding public key.

The certificate receiver adds the selected key value to the payload of the self-signed certificate to provide an augmented payload. In some examples, the certificate receiver replaces data in a public key field of the self-signed certificate with the selected key value. The certificate receiver employs the selected public key to attempt to verify the signature of the self-signed certificate with the augmented payload. If the verification authenticates the signature of the self-signed certificate, the certificate receiver assigns the selected public key as the public key for the self-signed certificate.

Conversely, if the verification of the signature is not successful (not validated with the verification), the certificate receiver refrains from assigning (selecting) the selected public key as the public key for the certificate issuer. Instead, the certificate receiver may generate a key value based on a next corresponding public key. In this situation, the operations for generating the augmented payload and attempting to verify the signature of the self-signed certificate are repeated for the next key value and the next corresponding public key for the certificate issuer is found.

The operations for generating and authenticating the public key certificate obviate the need to include a public key of the self-signed certificate or to otherwise transmit the public key to the certificate receiver over an unsecured network. Additionally, in some examples, the operations for generating and authenticating the self-signed certificate obviate the need to put the key value on the self-signed certificate. Instead, the self-signed certificate includes a signature that is based in part on the key value, which in turn is based on the public key and this signature is employed by the certificate receiver to authenticate the self-signed certificate.

FIG. 1 illustrates an example of a system 100 that includes a certificate issuer 104 (a self-signed certificate issuer) that generates (issues) a self-signed certificate 108. In some examples, the self-signed certificate 108 is an X.509 certificate. The self-signed certificate 108 is received by a certificate receiver 112. The certificate issuer 104 and the certificate receiver 112 represent computing platforms. Accordingly, in various examples, the certificate issuer 104 and the certificate receiver 112 include a non-transitory memory that includes machine-readable instructions and a processor core (or multiple processor cores) for accessing the memory and executing the machine-readable instructions. Additionally, in some examples, the certificate issuer 104 and the certificate receiver 112 represent a cryptoprocessor with embedded instructions. In some examples, the certificate issuer 104 represents a computing platform of a self-signing certificate authority (SSCA). In such examples, the self-signed certificate 108 represents a root certificate. In other examples, the certificate issuer 104 is external to the self-signing SSCA, and the self-signed certificate 108 is an intermediate certificate. The self-signed certificate 108 includes a payload 114 that includes data employable for authenticating and integrity validation of the self-signed certificate 108. The payload 114 includes, for example, user information (e.g., in situations where the self-signed certificate 108 is a chained certificate), and information identifying a certificate authority, certificate version, a validity interval of time, certificate policies, etc. The payload 114 also includes a public key field. The self-signed certificate payload 114 may also include an algorithm employable for public key selection for the self-signed certificate 108 such that the certificate receiver 112 is able to verify the authenticity of the self-signed certificate 108.

The certificate issuer 104 obtains an asymmetric key pair, such as a public key 116 and a corresponding private key 120 that are used to generate the self-signed certificate 108. Accordingly, information encrypted by the public key 116 is only decryptable with the private key 120 and data signed with the private key 120 is only authenticated with the public key 116. Initially, the public key 116 is stored in the public key field of the payload 114 of the self-signed certificate 108.

The certificate issuer 104 includes a key value generator 122 and a certificate generator 124 executing thereon (e.g., software application executing in memory). The key value generator 122 includes a hash function 128 and a signer 130 that generates a key value 132. The hash function 128 is a one-way function, such that the input of the hash function 128 cannot be easily derived based on an output of the hash function 128. More generally, the hash function 128 represents a hash algorithm that outputs a digest of an inputted value. The signer 130 represents a digital signature algorithm that signs the digest with a private key (e.g., the private key 120 of the certificate issuer 104). The key value 132 represents a secret element based on the public key 116 that is non-feasible to decode without prior knowledge that is not exposed to any entity other than the certificate issuer 104 and the certificate receiver 112.

In some examples, the hash function 128 is applied to the public key 116 (only) to provide a digest of the public key 116. In some such examples, this digest of the public key 116 is employed as the key value 132. In other examples, the key value generator 122 employs the signer 130 to digitally sign the digest of the public key 116 with the private key 120 of the certificate issuer 104 to provide a signed digest. In these examples (where the digest is signed), the signed digest of the public key 116 is employed as the key value 132.

In other examples, the key value generator 122 applies the hash function 128 on a key combination. The key combination is formed as a concatenation of the public key 116 and a second value 136, or multiple second values. In various examples, the second value 136 is a nonce value (e.g., an arbitrary/random number), multiple nonce values, a hashed metadata (HMD) value, or a combination of nonce value(s) and HMD value(s). In such situations, the HMD value characterizes a value stored on immutable memory of the certificate receiver 112, such as a read only memory (ROM) version and/or a silicon version of a processor core of the certificate receiver 112. Alternatively, the HMD values can be stored in volatile memory or non-volatile memory of the certificate receiver 112. Further, in some examples, the HMD values can be stored in extensions of the self-signed certificate 108 that are retrievable for authentication of the certificate issuer 104. In such examples, more generally, the HMD values characterize an immutable feature of the certificate receiver 112, and the HMD values are known to the certificate generator 124 and the certificate authenticator 144.

In examples where a key combination is employed, the key value generator 122 applies the hash function 128 to the key combination to generate a digest of the key combination. In some examples, the digest of the key combination is employed as the key value 132. In other examples, the key value generator 122 employs the signer 130 to digitally sign the digest of the key combination with the private key 120 of the certificate issuer 104 to provide a signed digest of the key combination. In these examples (where the digest is signed), the signed digest of the key combination is employed as the key value 132.

Conventionally, public keys of entities (e.g., the certificate issuer 104) are provided in clear text to external entities. In this manner, the external entities employ these public keys to encrypt messages that are only decryptable with the corresponding private keys of an asymmetric key pair. Additionally, the external entities employ the public keys to authenticate data signed with the corresponding private keys. However, because the number of possible public keys and private keys to form the respective public key 116 and the private key 120 of the certificate issuer 104 is finite, a full list of asymmetric key pairs and key values (e.g., a key value 132 generated only with the public key 116, such that a key combination is not employed) can be computed. Thus, there is a potential threat that the private key 120 can be derived if a third party possess the public key 116, including the security of the system 100 using hints gathered from the public key 116, and using exceptional measures, such as the use of a quantum computer. This threat is likely to increase as the capabilities of quantum computers continue to advance. Further, even in situations where the third party does not have access to the public key 116, if the third party accesses the key value 132 (where the key value is based only on the public key 116), each permutation of the possible public keys and private keys can be found using these exceptional measures.

In view of the above, the private key 120 includes vulnerabilities, the certificate generator 124 of the certificate issuer 104 is configured/programmed to generate the self-signed certificate 108 without including either the public key 116 (in clear text) on the payload 114 of the self-signed certificate 108, or elsewhere in the self-signed certificate 108. Additionally, in some examples, the key value 132 is also removed from the self-signed certificate 108.

The certificate generator 124 includes a hash function 138 and a signer 140. The hash function 138 and the signer 140 operate in a similar manner to the hash function 128 and the signer 130 of the key value generator 122. The hash function 138 and the signer 140 can employ the same or different algorithms as the respective hash function 128 and the signer 130 of the key value generator 122. In examples where the hash function 138 and the signer 140 are different than the hash function 128 and the signer 130, an additional public-private key pair is employed to generate the self-signed certificate 108.

In operation, the certificate generator 124 receives the key value 132 from the key value generator 122. The certificate generator 124 replaces data stored in the public key field of the payload 114 with the key value 132, such that the payload 114 is modified and can be referred to as a modified payload 114. The hash function 138 is applied to the modified payload 114 to generate a digest of the payload 114. Additionally, the certificate generator 124 inputs the digest of the payload 114 and the private key 120 into the signer 140 to digitally sign the modified payload to provide a signature 142 (a digital signature) for the self-signed certificate 108. The certificate generator 124 adds the signature 142 to the self-signed certificate 108. In some examples, the signature 142 is added to a public key validation section of the self-signed certificate 108. Also, in some examples, the additional information, including a hash algorithm identifier (ID), a cipher ID and/or other parameters are also added to the self-signed certificate 108.

In some examples, responsive to adding the signature 142 to the self-signed certificate 108, the certificate generator 124 can remove and/or otherwise exclude the key value 132 from the key value field of the payload 114 of the self-signed certificate 108. In some such examples, the data of the key value field is replaced with null data, a string of zeros (or similar data), fake data, and/or a recovery hint. Accordingly, the key value 132 is illustrated with a dashed line in the payload 114. Responsive to the removal, the certificate generator 124 provides the self-signed certificate 108 to an external system, which can include but is not limited to the certificate receiver 112. By generating the self-signed certificate 108 in this manner, the signature 142 of the self-signed certificate 108 reflects the presence of the key value 132 (e.g., the signature 142 is based on a digest of the modified payload 114 that includes the key value 132), even though the key value 132 is excluded from the payload 114. Accordingly, it is not feasible to derive the public key 116 from the self-signed certificate 108.

In other examples, the key value 132, such as examples where the key value 132 is based on the key combination (a concatenation of the public key 116 and the second value 136 or multiple second values 136), the key value 132 is not excluded or removed from the self-signed certificate 108 that is provided to the certificate receiver 112. However, in some examples where the key value 132 is based on the key combination, the key value 132 is still removed and/or excluded from the payload 114 of the self-signed certificate 108 that is provided to the certificate receiver 112.

As noted, the certificate receiver 112 receives the self-signed certificate 108. The certificate receiver 112 includes a certificate authenticator 144 executing thereon (e.g., in memory). The certificate authenticator 144 is a self-signed certificate authenticator. Unless otherwise stated, throughout this description, the term certificate authenticator (including the certificate authenticator 144) refers to a self-signed certificate authenticator. As noted, the self-signed certificate 108 does not include a copy of the public key 116 of the certificate issuer 104 and may not include a copy of the key value 132. However, the payload 114 includes information, such as the recovery hint, characterizing how to select the relevant public key 116 from a set of candidate public keys 156 located at a public key database 148 for the self-signed certificate 108. Stated differently, the information in the self-signed certificate 108 is employable to determine how the key value 132 (that is based on the public key 116) was generated, including for example, an order of concatenation of values.

In some examples, the certificate receiver 112 includes a public key database 148 that stores K number of candidate key values 152 and K number of corresponding public keys 156 stored on the memory of the certificate receiver 112, where K is an integer greater than or equal to one. Stated differently, a given one of the K number of key values 152 has a corresponding public key 156 stored on the certificate receiver 112. In some examples, records in the public key database 148 are preloaded (e.g., in a secure computing facility). In other examples, the K number of candidate key values 152 are generated by the certificate authenticator 144 based on information included in the self-signed certificate 108, such as the recovery hint, if included. In still other examples, the candidate key values 152 are generated on the fly (e.g., as needed basis).

Responsive to receiving the self-signed certificate 108, the certificate authenticator 144 extracts the signature 142 from the self-signed certificate 108. In some examples, the certificate authenticator 144 extracts a public key validation section that includes the signature 142 of the self-signed certificate 108. Additionally, in some examples, the certificate authenticator 144 selects one of the K number of candidate key values 152 (e.g., KEY VALUE$_1$), which is referred to as a first key value 152 from the public key database 148 and selects a corresponding public key 156 (e.g., PUBLIC KEY$_1$). In other examples, the certificate authenticator 144 generates the first key value 152 based on information in the self-signed certificate 108 and/or a-priori information.

In some examples, responsive to providing the first key value 152 and the selected public key, the certificate authenticator 144 adds (augments) the payload 114 of the self-signed certificate 108 with the first key value 152 to provide an augmented payload (alternatively referred to as a modified payload) for the self-signed certificate 108. In some examples, the certificate authenticator 144 adds (or replaces) data for the first key value 152 to the public key field of the payload 114. In examples where a key value is included in the self-signed certificate 108, this operation can be omitted.

The certificate authenticator 144 inputs the augmented payload in a hash function 160 to generate a digest for the augmented payload for the self-signed certificate 108. The hash function 160 has the same function as the hash function 138 of the certificate issuer 104. In some examples, the algorithm for the hash function 160 is specified in the payload 114.

The certificate authenticator 144 also includes a signature authenticator 164 to verify the signature 142 of the self-signed certificate 108. To verify the signature 142, the certificate authenticator 144 inputs the digest of the augmented payload 114, the signature 142 and the selected public key 156 corresponding to the first key value 152 into the signature authenticator 164. The signature authenticator 164 attempts to verify the signature 142 using the augmented payload 114 and the selected public key 156. Additionally, in examples where the key value 152 employed to generate the self-signed certificate 108 is a signed digest, the certificate authenticator 144 also verifies a signature of the key value 132 using the selected public key 156.

If the signature 142 is authenticated (e.g., validated) with the verification, the certificate authenticator 144 determines that the selected public key 156 (e.g., PUBLIC KEY$_1$) is the public key 116 for the certificate issuer 104, and the self-signed certificate 108 is authenticated. If the signature 142 is not authenticated, such that the verification of the signature 142 is not successful (e.g., the signature 142 is not validated), the certificate authenticator 144 selects or generates a key value (e.g., KEY VALUE$_2$) and a corresponding public key 156 (e.g., the PUBLIC KEY$_2$) and the certificate authenticator 144 regenerates the augmented payload and re-verifies the signature 142 using the newly selected key value 152 and the newly selected public key 156. This process is repeated until the certificate authenticator 144 identifies the public key 116 for the certificate issuer 104. or until the signature 142 is not verified with any of the K number of public keys 156 (e.g., the K number of public keys 156 has been exhausted). In this situation, the verification of the signature 142 has failed, and the certificate authenticator 144 does not trust the authenticity of the self-signed certificate 108.

Responsive to the identification of the certificate public key 116 of the certificate issuer 104, the certificate receiver 112 can employ the self-signed certificate 108 to authenticate data signed with the private key 120 of the certificate issuer 104. Additionally, an unauthorized third party (often referred to as Eve) would be unable to derive the public key 116 and/or the private key 120 of the certificate issuer 104, obviating the need for the certificate issuer 104 to send newly generated public keys to the certificate receiver 112.

Accordingly, the system 100 enables the self-signed certificate 108 to be authenticated and used for communication even though the self-signed certificate 108 omits the public key 116 for the certificate issuer 104. Additionally, in some examples, the self-signed certificate 108 also omits the key value 132. Accordingly, the operations described for generating the self-signed certificate 108 ensures secure communications even in situations where an advanced computer (e.g., a quantum computer) employed by the third party attempts to derive the public key 116.

Figure 2:
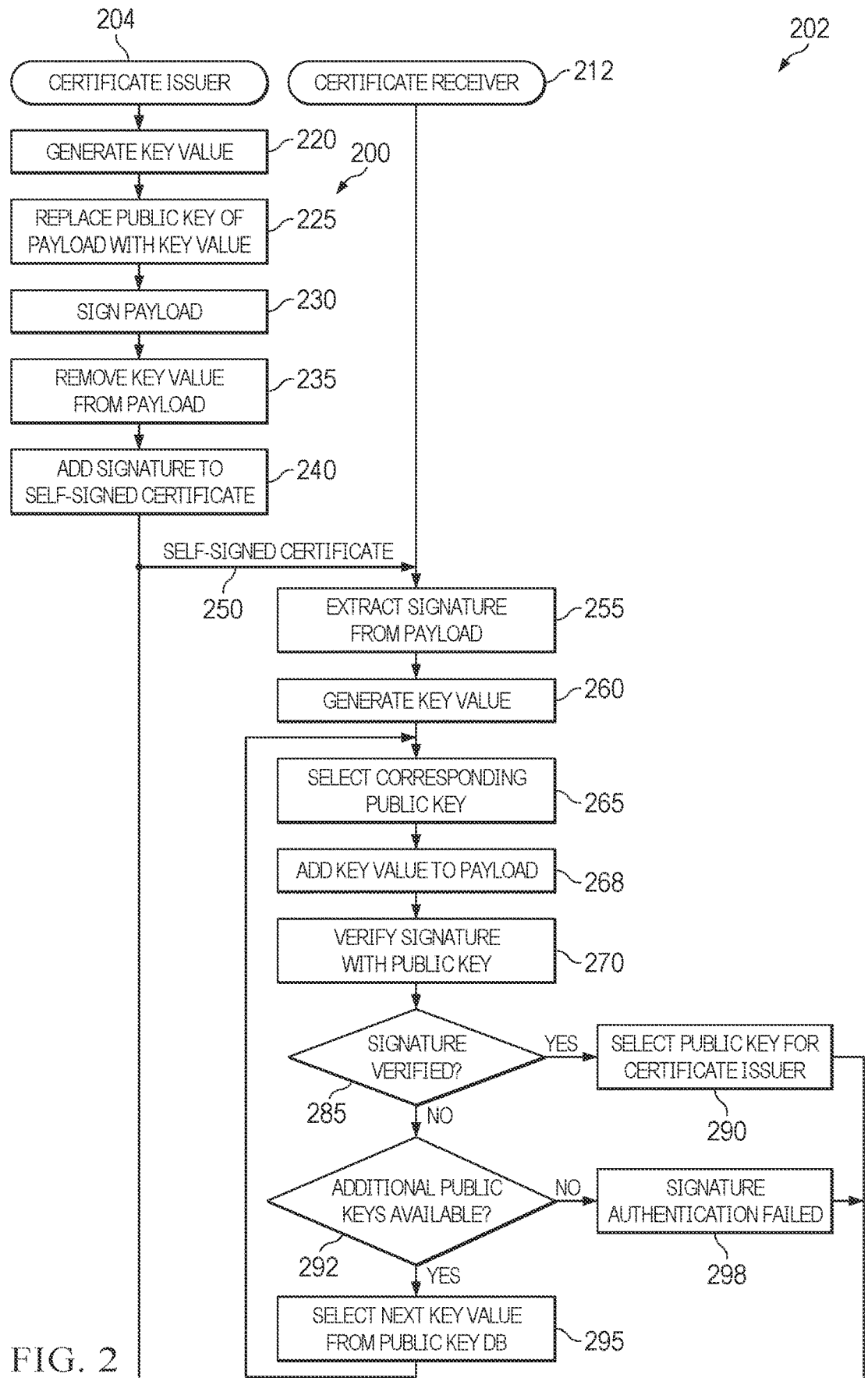
FIG. 2 illustrates a sequence diagram for operations to generate and authenticate a self-signed certificate.

FIG. 2 illustrates a sequence diagram illustrating operations 200 executed by a system 202 that includes a certificate issuer 204 and a certificate receiver 212. The operations 200 of the sequence diagram are executable by computing platforms that communicate over a network, such as the system 100 of FIG. 1. Accordingly, the certificate issuer 204 is implemented by the certificate issuer 104 and the certificate receiver 212 is implemented by the certificate receiver 112 in some examples.

At 220, the certificate issuer 204 generates a key value (e.g., the key value 132) for a self-signed certificate (e.g., the self-signed certificate 108 of FIG. 1). The key value is based on a public key (e.g., the public key 116) of the certificate issuer 204. In some examples, the key value is based only on the public key, and in some examples, the key value is based on a key combination formed with a concatenation of the public key and a second value (e.g., the second value 136) or multiple second values. This second value could be, a nonce value (or multiple nonce values), an HMD value for the certificate receiver 212, etc.

At 225, the certificate issuer 204 replaces data in a public key field of a payload (e.g., the payload 114) of the self-signed certificate with the key value. At 230, the certificate issuer 204 signs the payload (that includes the key value) using a private key (e.g., the private key 120) of the certificate issuer 204 to provide a signature (e.g., the signature 142). At 235, in some examples, the certificate issuer 204 removes the key value from the payload of the self-signed certificate. In other examples, such as examples where the key value is based only on the public key of the certificate issuer 204, the key value is not removed from the self-signed certificate. In some examples, the certificate issuer 204 adds data in place of data in the key value field with a null value, a set string (e.g., a numerical string with the same length as the key value 403), a random number or a recovery hint.

At 240, the signature of the payload (that includes the key value) is added to the self-signed certificate. In some examples, the signature is added to a public key validation section of the self-signed certificate. In this manner, the digital signature of the payload reflects the presence of the key value, even though the key value may have been removed from (e.g., signed and not indicated on the payload) the self-signed certificate.

At 250, the self-signed certificate is generated and provided to the certificate receiver 212 through a communication interface that may or may not be encrypted or via a physical interface of the device. At 255, the certificate receiver 212 extracts the signature from the self-signed certificate. At 260, the certificate receiver 212 generates (or selects) a key value (e.g., the key value 152). In some examples, the key value is generated based on information included in the self-signed certificate (e.g., the recovery hint). In other examples, the certificate receiver 212 retrieves the key value from a public key database (e.g., the public key database 148). At 265, the certificate receiver 212 selects a public key (e.g., the corresponding public key 156) corresponding to and/or otherwise associated with the key value from a set of candidate public keys.

At 268, the certificate receiver 212 adds the key value to the payload of the self-signed certificate to provide an augmented payload (alternatively referred to as a modified payload). At 270, the certificate receiver 212 verifies the signature of the self-signed certificate based on the augmented payload (the payload that includes the key value) and the selected public key. Additionally, in some examples, the certificate receiver 212 verifies a signature of the key value, such as examples where the key value is a signed digest.

At 285, the certificate receiver 212 makes a determination as to whether the signature of the certificate issuer 204 is authenticated (validated). If the determination at 285 is positive (e.g., YES), the certificate receiver 212 proceeds to 292. If the determination at 285 is negative (e.g., NO), the certificate receiver 212 proceeds to 295. At 290, the certificate receiver 212 selects the public key as the public key for the certificate issuer 204. Thus, at 290, the certificate receiver 212 successfully authenticates the self-signed certificate.

At 292, the certificate receiver 212 makes a determination as to whether additional public keys are available to authenticate the signature of the self-signed certificate. If the determination at 292 is positive (e.g., YES), the certificate receiver 212 proceeds to 295. If the determination at 292 is negative (e.g., NO), the certificate receiver 212 proceeds to 298. At 295, the certificate receiver 212 refrains from selecting the selected public key as the public key for the certificate issuer responsive to the verification of the signature being unsuccessful (e.g., the signature is not validated). Instead, at 295, responsive the signature of the self-signed certificate not being verified, the certificate receiver 212 selects a next key value from the public key database, and the certificate receiver 212 returns to 265. At 298, the certificate receiver 212 determines that authentication of the signature of the self-signed certificate has failed (e.g., the public keys at the certificate receiver 212 have been exhausted), such that the certificate receiver 212 does not trust the authenticity of the self-signed certificate.

The operations 200 obviate the need to include either a public key of the certificate issuer 204 on the self-signed certificate provided from the certificate issuer 204 to the certificate receiver 212. Instead, the self-signed certificate includes a signature that is based in part on the key value, and this key value is based on the public key of the certificate issuer 204. Moreover, the signature is employed by the certificate receiver 212 to authenticate the self-signed certificate.

Figure 3:
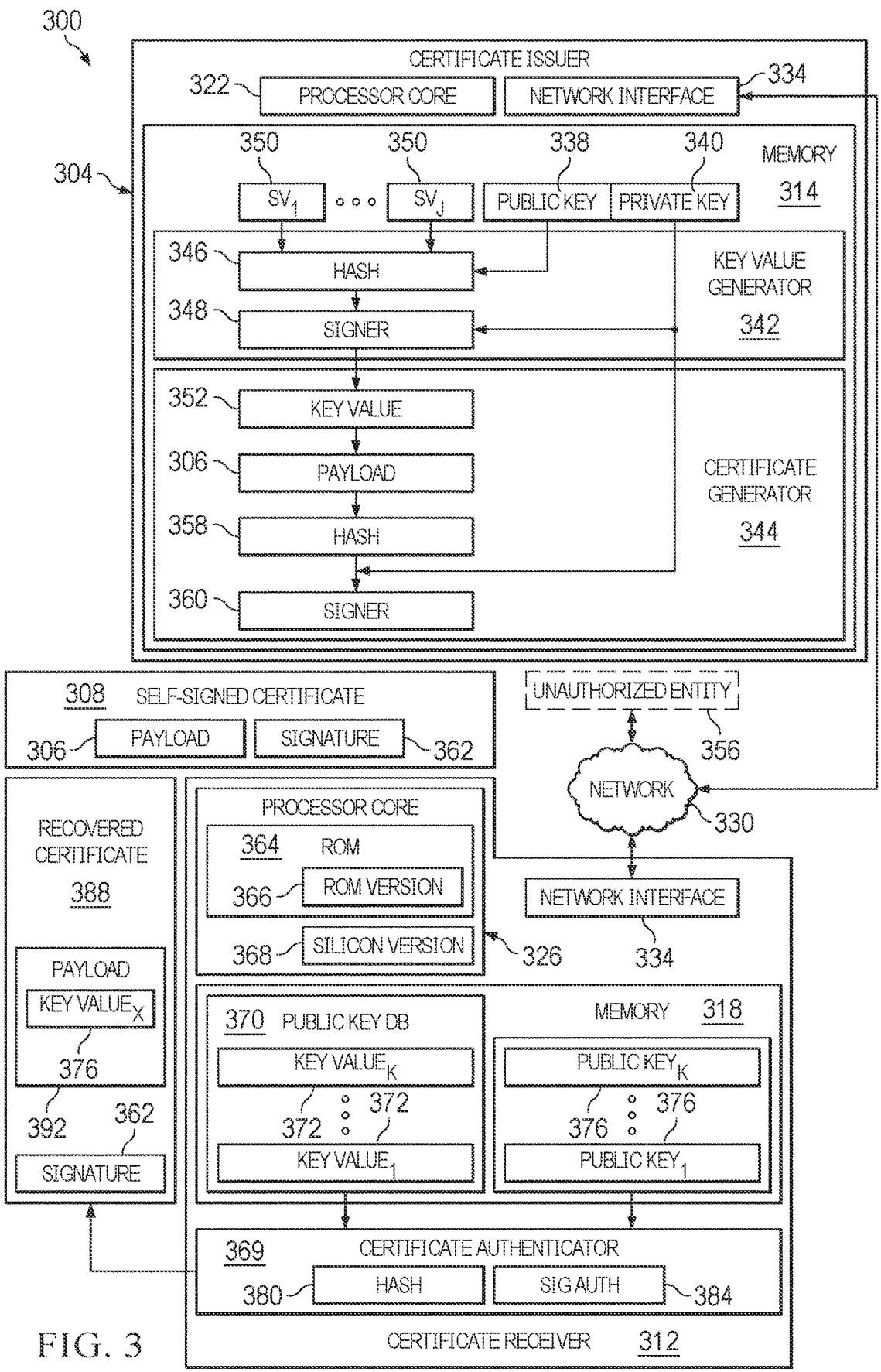
FIG. 3 illustrates another a system for generating and authenticating a self-signed certificate.

FIG. 3 illustrates an example of a system 300 that includes a certificate issuer 304 that generates (issues) a self-signed certificate 308, such as an X.509 certificate. The system 300 is employed to implement an example of the system 100 of FIG. 1. The self-signed certificate 308 is received by a certificate receiver 312. Accordingly, the certificate issuer 304 is employable to implement the certificate issuer 104 of FIG. 1 and the certificate receiver 312 is employable to implement the certificate receiver 112 of FIG. 1. The certificate issuer 304 and the certificate receiver 312 represent computing platforms. Accordingly, the certificate issuer 304 includes a memory 314 implemented as a non-transitory machine-readable medium for storing data and machine-executable instructions. Similarly, the certificate receiver 312 also includes a memory 318 implemented as a non-transitory machine-readable medium for storing data and machine-executable instructions. The memory 314 and the memory 318 are implemented with random access memory (RAM), flash memory, a solid state drive, a hard disk drive, read only memory (ROM), registers, fuses one-time programmable memory, electronically erasable programmable read-only memory (EEPROM) or a combination thereof. The certificate issuer 304 includes a processor core 322, and the certificate receiver 312 also includes a processor core 326. The processor core 322 and/or the processor core 326 are implemented as a cryptoprocessor in some examples.

The certificate issuer 304 and the certificate receiver 312 communicate through a network 330, such as the Internet or via a physical interface of the device. In some examples, the certificate issuer 304 and the certificate receiver 312 include a network interface 334 (e.g., a network interface card) for communicating with the network 330.

In some examples, the certificate issuer 304 and/or the certificate receiver 312 are implemented in a computing cloud. In such a situation, features of the certificate issuer 304 and/or the certificate receiver 312, such as the processor core 322 of the certificate issuer 304, the processor core 326 of the certificate receiver 312, the network interface 334, and the memory 314 and/or the memory 318 could be representative of a single instance of hardware or multiple instances of hardware with applications executing across the multiple of instances (e.g., distributed) of hardware (e.g., computers, routers, memory, processors, or a combination thereof). Alternatively, the certificate issuer 304 and/or the certificate receiver 312 could be implemented on a single dedicated computer.

Figure 4A:
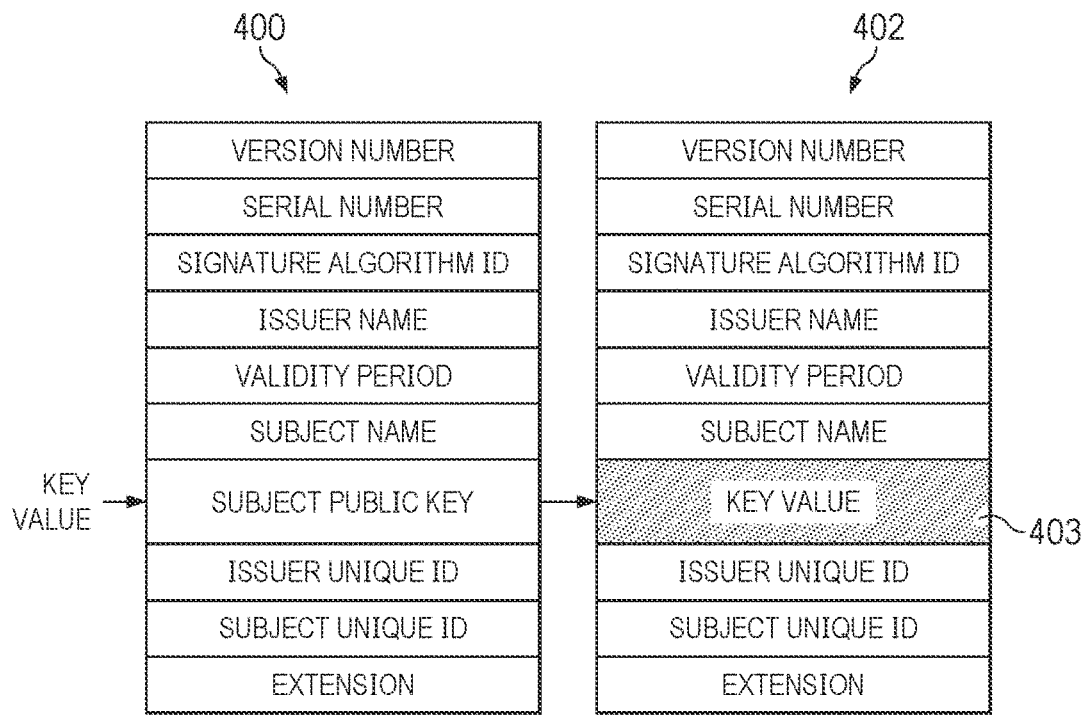
FIG. 4A illustrates examples of payloads for self-signed certificates.

In some examples, the certificate issuer 304 represents a computing platform of an SSCA. In such examples, the self-signed certificate 308 represents a root certificate. In other examples, the certificate issuer 304 is external to the SSCA, and the self-signed certificate 308 is an intermediate certificate. The self-signed certificate 308 includes a payload 306 that includes data employable for authenticating the self-signed certificate 308. The payload 306 includes, for example, user information (e.g., in situations where the self-signed certificate 308 is not a root certificate), and information identifying a certificate authority, a validity interval of time, certificate policies, etc. FIG. 4A illustrates an example of a payload 400 that is employable to implement the payload 306 of the self-signed certificate 308.

The payload 402 includes data fields, such as a version number field, a serial number field, a signature algorithm ID field, an issuer name field, a validity period field, a subject name field, a subject public key field, an issuer unique ID field and an extension field. These data fields comply with standards set forth in the X.509 ITU standard.

Referring back to FIG. 3, as demonstrated by the payload 402 of FIG. 4A, the payload 306 of the self-signed certificate 308 also includes information identifying an algorithm employable to verify a signature of the self-signed certificate 308.

The certificate issuer 304 includes a public key 338 and a corresponding private key 340. The public key 338 and the private key 340 form an asymmetric key pair. Accordingly, data encrypted by the public key 338 is only decryptable with the private key 340 and data signed with the private key 340 is only authenticable with the public key 338.

The certificate issuer 304 includes a key value generator 342 and a certificate generator 344 in the memory 314. The key value generator 342 includes a hash function 346 and a signer 348. The memory 314 also stores J number of second values 350 (SVs), where J is an integer greater than or equal to zero (the second value may be omitted in some examples).

The key value generator 342 generates a key value 352 based at least on the public key 338.

The hash function 346 is a one-way function, such that the input of the hash function 346 cannot be easily derived based on an output of the hash function 346. More generally, the hash function 346 represents a hash algorithm that outputs a digest of an inputted value. The signer 348 represents a digital signature algorithm that signs the digest with a private key (e.g., the private key 340 of the certificate issuer 304). The key value 352 represents a secret element based on the public key 338 that is non-feasible to decode without prior knowledge that is not exposed to any entity other than the certificate issuer 304 and the certificate receiver 312.

In some examples, the hash function 346 is applied to the public key 338 (only) to provide a digest of the public key 338. In some such examples, this digest of the public key 338 is employed as the key value 352. In other examples, the key value generator 342 employs the signer 348 to digitally sign the digest of the public key 338 with the private key 340 of the certificate issuer 304 to provide a signed digest. In these examples (where the digest is signed), the signed digest of the public key 338 is employed as the key value 352.

In other examples, the key value generator 342 applies the hash function 346 on a key combination. The key combination is formed as a concatenation of the public key 338 and one or more of the second values 350. In various examples, the J number of second values 350 represent a nonce value (e.g., an arbitrary/random number) or hashed metadata (HMD) value.

In examples where a key combination is employed, the key value generator 342 applies the hash function 346 to the key combination to generate a digest of the key combination. In some examples, the digest of the key combination is employed as the key value 352. In other examples, the key value generator 342 employs the signer 348 to digitally sign the digest of the key combination with the private key 340 of the certificate issuer 304 to provide a signed digest of the key combination. In these examples (where the digest is signed), the signed digest of the key combination is employed as the key value 352.

Conventionally, public keys of entities (e.g., the certificate issuer 304) are provided in clear text to external entities. In this manner, the external entities employ these public keys to encrypt messages that are only decryptable with the corresponding private keys of an asymmetric key pair. Additionally, these external entities employ these public keys to authenticate data signed with the corresponding private keys of an asymmetric key pair. Thus, if an unauthorized entity 356 (e.g., a hacker often referred to as Eve) accesses the public key 338, this unauthorized entity 356 is a potential threat to find the private key 340 using hints from the public key 338 and exceptional measures, such as a quantum computer. Further, even in situations where the unauthorized entity 356 does not have access to the public key 338, if the unauthorized entity 356 has access to the key value 352, each permutation of the possible public keys and private keys can be found through these exceptional measures.

In view of these security vulnerabilities, the certificate generator 344 of the certificate issuer 304 is configured/programmed to generate the self-signed certificate 308 without including either the public key 338 (in clear text) on the payload 306 of the self-signed certificate 308, or elsewhere in the self-signed certificate 308. Additionally, in some examples, the key value 352 is also removed or otherwise excluded from the self-signed certificate 108.

The certificate generator 344 includes a hash function 358 and a signer 360. The hash function 358 and the signer 360 operate in a similar manner to the hash function 346 and the signer 348 of the key value generator 342. The hash function 358 and the signer 360 can employ the same or different algorithms as the respective hash function 346 and the signer 348 of the key value generator 342.

In operation, the certificate generator 344 receives the key value 352 from the key value generator 342. The certificate generator 344 replaces data stored in a public key field of the payload 306 with the key value 352, such that the payload 306 is modified and can be referred to as a modified payload 306. FIG. 4A illustrates this concept. In particular, in FIG. 4A, the payload 400 is modified such that the key value field ("SUBJECT PUBLIC KEY") is replaced with a key value 403 to provide a modified payload 402. In some examples, other data fields are modified and/or added, and in some examples other data fields are not modified.

Referring back to FIG. 3, the hash function 358 is applied to the modified payload 306 to generate a digest of the payload 306. Additionally, the certificate generator 344 inputs the digest of the payload 306 and the private key 340 into the signer 360 to digitally sign the modified payload to provide a signature 362 (a digital signature) for the self-signed certificate 308, such as to a public key validation section of the self-signed certificate 308. The certificate generator 344 adds the signature 362 to the self-signed certificate 308. In some examples, the additional information, including a hash algorithm identifier (ID), a cipher ID and/or other parameters are also added to the self-signed certificate 308.

Figure 4B:
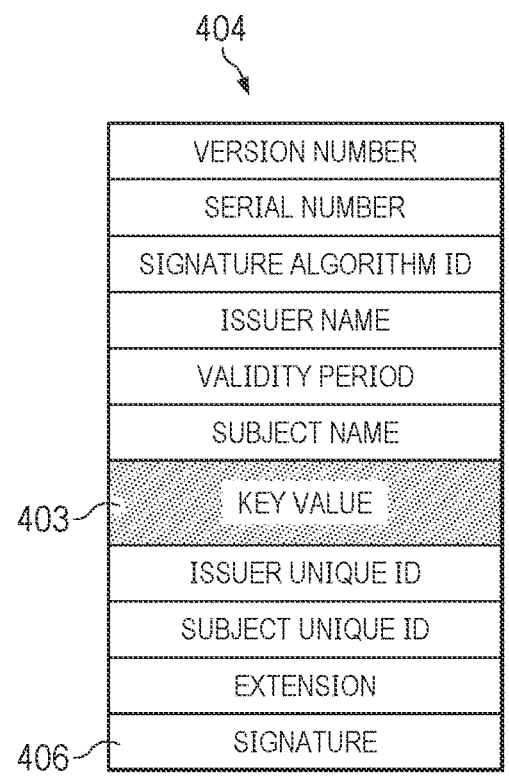
FIG. 4B-4D illustrate examples of formats of self-signed certificates.

FIG. 4B illustrates an example of a self-signed certificate 404 in a first format that is employable to implement the self-signed certificate 308 of FIG. 1. The self-signed certificate 404 includes the modified payload 402 of FIG. 4A and a signature 406. In the example illustrated, the key value 403 is included in the self-signed certificate 404.

Referring back to FIG. 3, in some examples, responsive to adding the signature 362 to the self-signed certificate 308, the certificate generator 344 can remove and/or otherwise exclude the key value 352 from the key value field of the payload 306 (or elsewhere in the self-signed certificate 308). In some such examples, the data of the key value field is replaced with null data, a string of zeros (or similar data), fake data, and/or a recovery hint. The recovery hint can include, for example, nonce values and/or an order of concatenation of the public key 338 and the J number of second values 350. The replacement data may have the same bit length as the key value or have a different bit length than the key value. For example, the certificate generator 344 may be configured to remove the entire key value 352 from the payload 306 and replace the removed value 352 with replacement data having a shorter bit length.

As noted, in various examples, the key value 352 is based only on the public key 338, or a key combination, which is formed as a concatenation of the public key 338 and the J number of second values 350. In various examples, the J number of second values 350 include a nonce value (e.g., an arbitrary/random number), HMD values or some combination thereof. In such situations, the HMD values characterizes a value stored in immutable memory, such as a ROM 364 of the certificate receiver 312. For example, the HMD values could characterize a ROM version 366 and/or a silicon version 368 of the processor core 326 of the certificate receiver 312. Alternatively, the HMD values can be stored in the memory 318 of the certificate receiver 312. Further, in some examples, the HMD values can be stored in extensions of the self-signed certificate 308 that are retrievable for authentication of the certificate issuer 304.

More generally, hashed metadata (HMD) refers to descriptive information related to immutable components or devices, such as a make and model, serial number, firmware version and/or other technical details. In general, hashed metadata is employable to identify and manage device resources. Also, hashed metadata may include information about the device's performance, such as a processing speed, memory capacity and/or storage capacity of a device. Thus, employment of the HMD values to generate the key value 352 for the certificate receiver 312 is employable to increase security of the self-signed certificate 308.

In some examples, the recovery hint (if included) can characterize certificate metadata signaling to the payload 306 of the self-signed certificate 308 that describes features of the key value 352. For example, the certificate metadata signaling includes a nonce value (or multiple nonce values), data indicating that the ROM version 366 and/or the silicon version 368 (without revealing a value for the ROM version 366 and/or the silicon version 368) is employed to calculate the key value, etc.

Figure 4C:
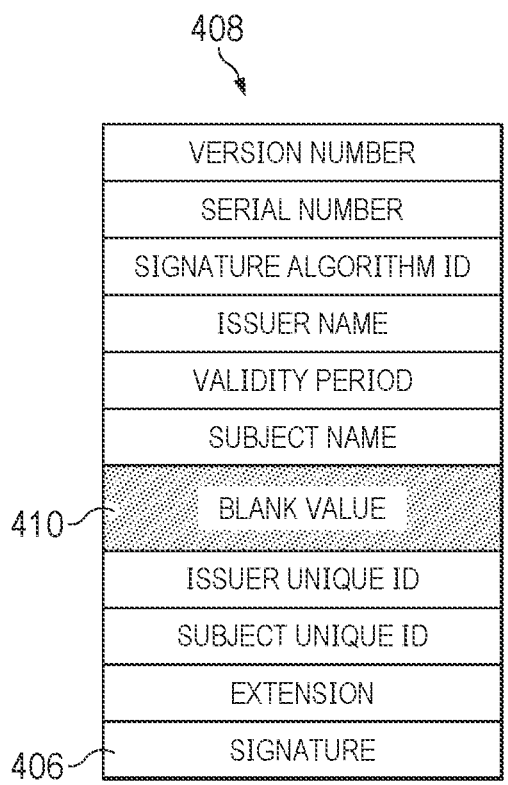
Figure 4D:
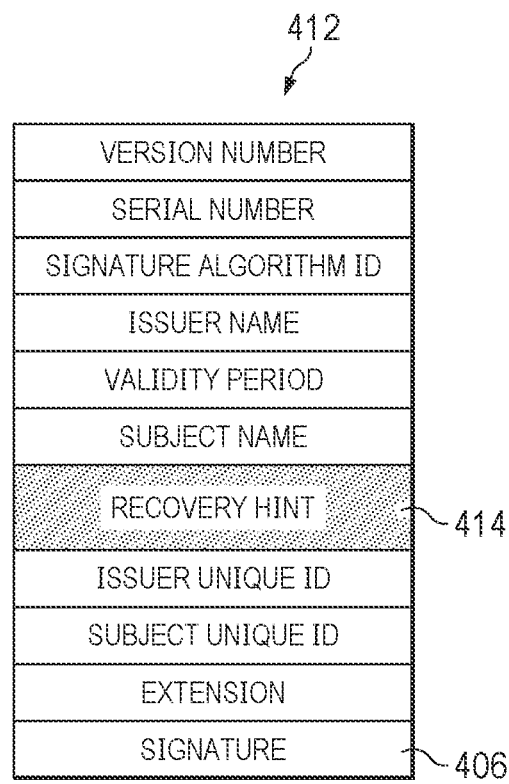

FIG. 4C illustrates an example of a self-signed certificate 408 where a blank value 410 (e.g., a null value or a random string or a string of 0's or 1's) replaces the key value 403 in the public key field. The blank value 410 may have the same bit length as the key value 403 or have a different bit length than the key value 403. FIG. 4D illustrates an example of a self-signed certificate 412 where a recovery hint 414 is added in place of the key value 403 in the public key field. The recovery hint 414 may have the same bit length as the key value 403 or have a different bit length than the key value 403.

Referring back to FIG. 3, the certificate generator 344 provides the self-signed certificate 308 to an external system, which can include but is not limited to the certificate receiver 312. By generating the self-signed certificate 308 in this manner, the signature 362 of the self-signed certificate 308 reflects the presence of the key value 352 (e.g., the signature 362 is based on a digest of the modified payload 306 that includes the key value 352), even in examples where the key value 352 is not present in the payload 306. Accordingly, it is not feasible to derive the public key 338 from the self-signed certificate 308.

As noted, the certificate receiver 312 receives the self-signed certificate 308. The certificate receiver 312 includes a certificate authenticator 369 stored in the memory 318. As noted, the self-signed certificate 308 does not include a copy of the public key 338. Also, in some examples, the self-signed certificate 308 does not include a copy of the key value 352. However, the payload 306 includes an algorithm characterizing how the self-signed certificate 308 was generated.

The certificate receiver 312 includes a certificate authenticator 369 (a self-signed certificate authenticator) in the memory 318. In some examples, the certificate authenticator 369 employs the recovery hint (metadata signaling) embedded in the payload 306 of the self-signed certificate 308 to facilitate authentication of the self-signed certificate 308. In other examples, the certificate authenticator 369 employs predefined/preprogrammed rules to authenticate the self-signed certificate 308.

Figure 5A:
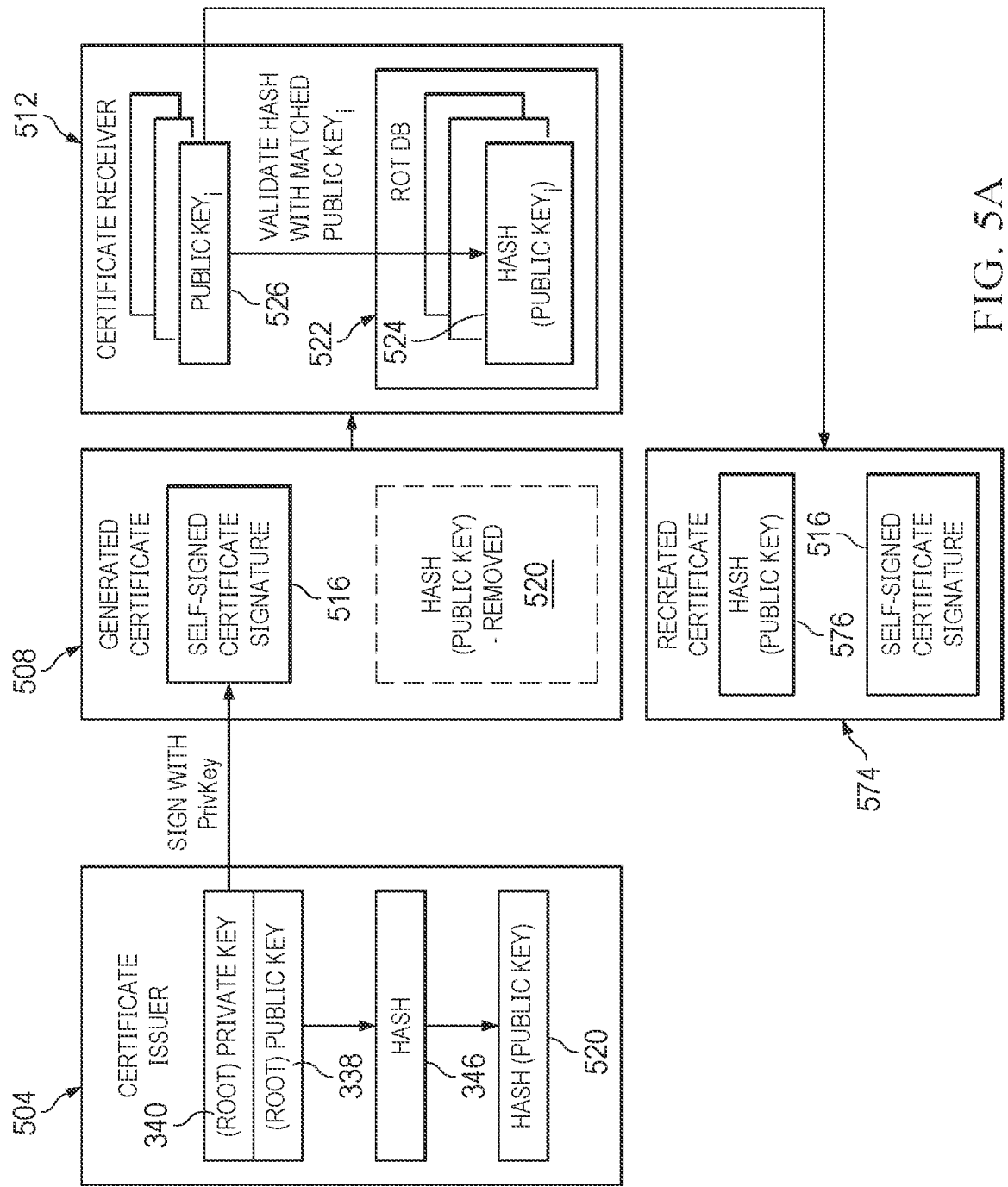
FIGS. 5A-5D illustrate examples of generated and recreated self-signed certificates.
Figure 5B:
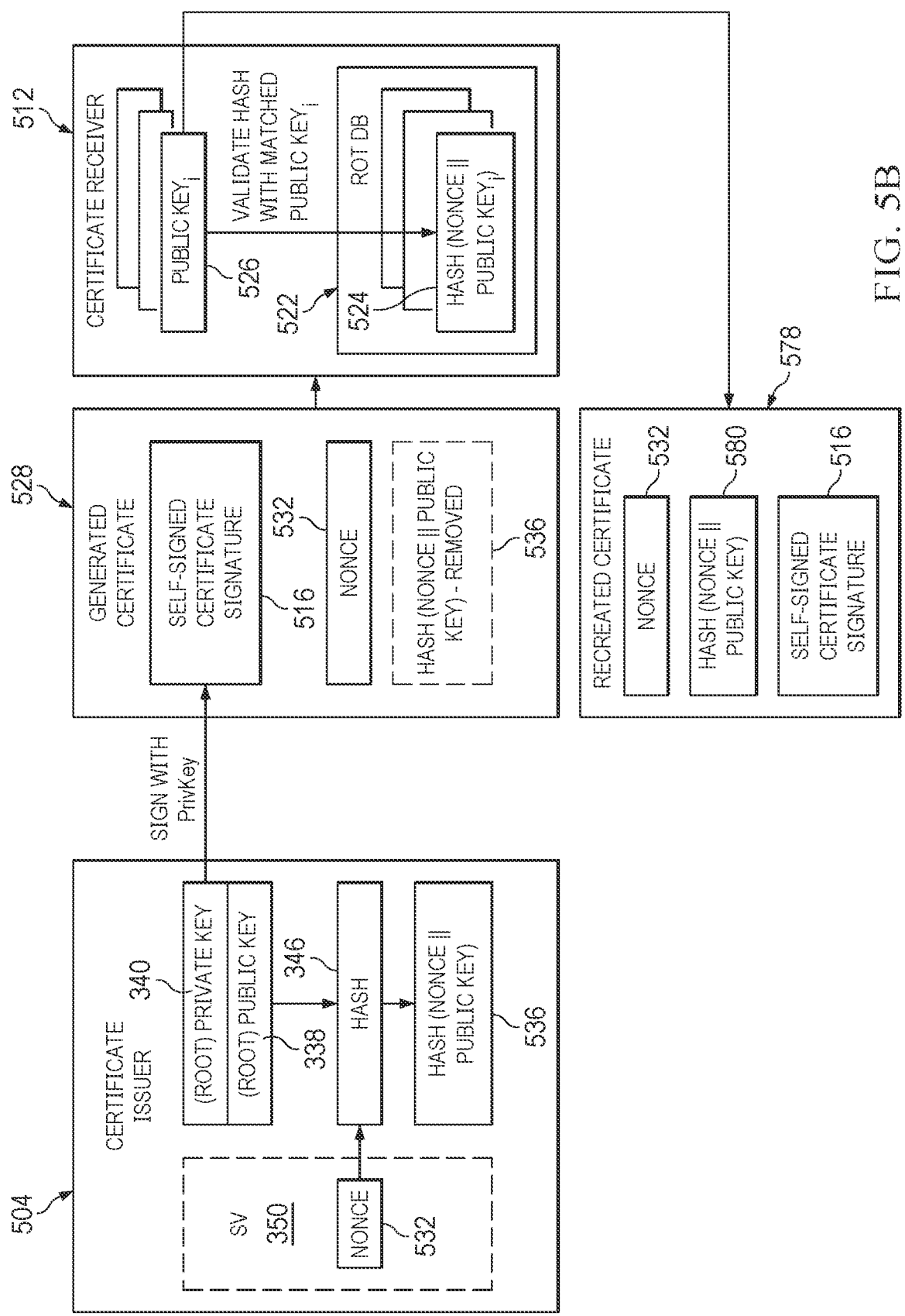
Figure 5C:
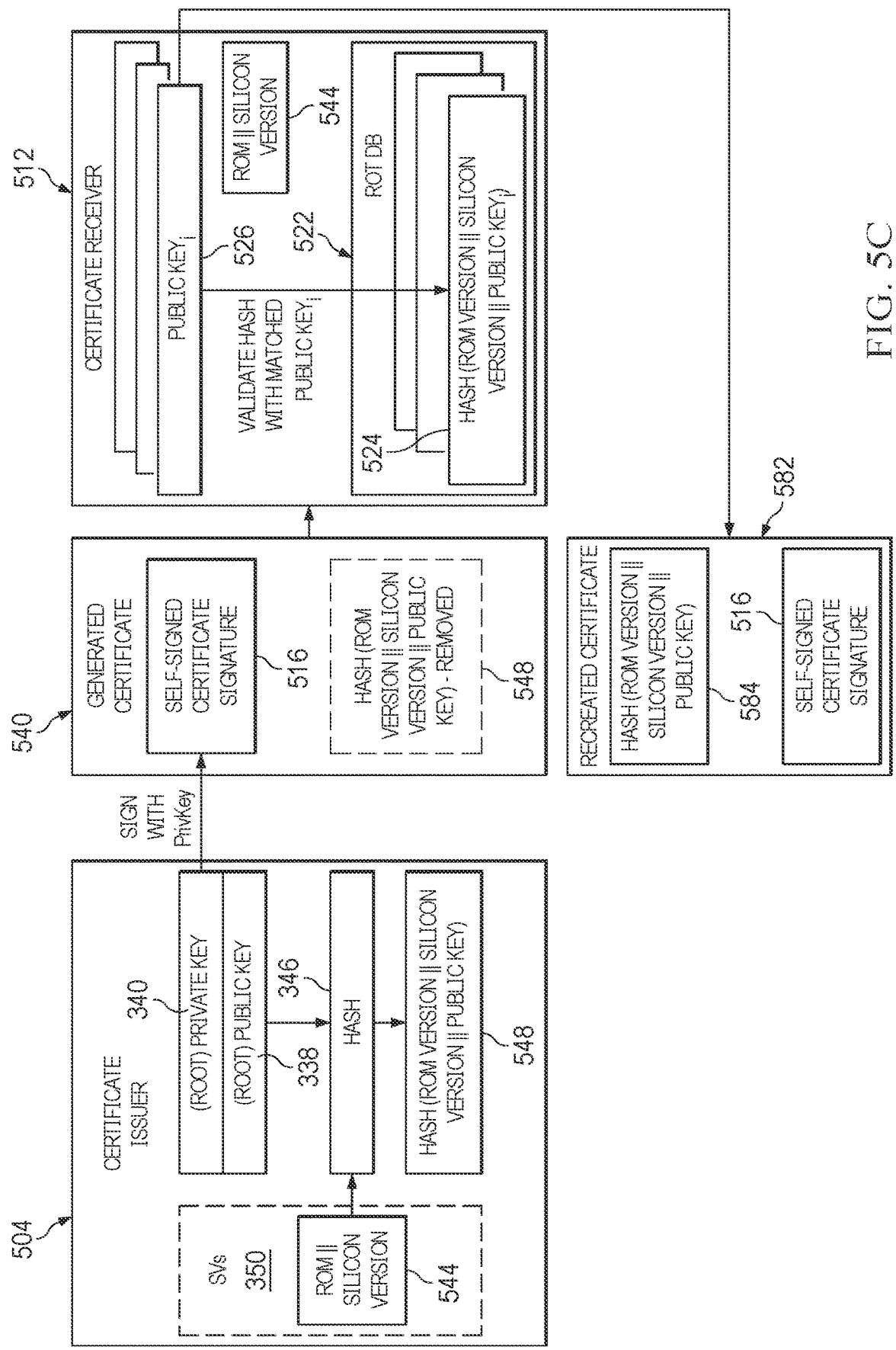
Figure 5D:
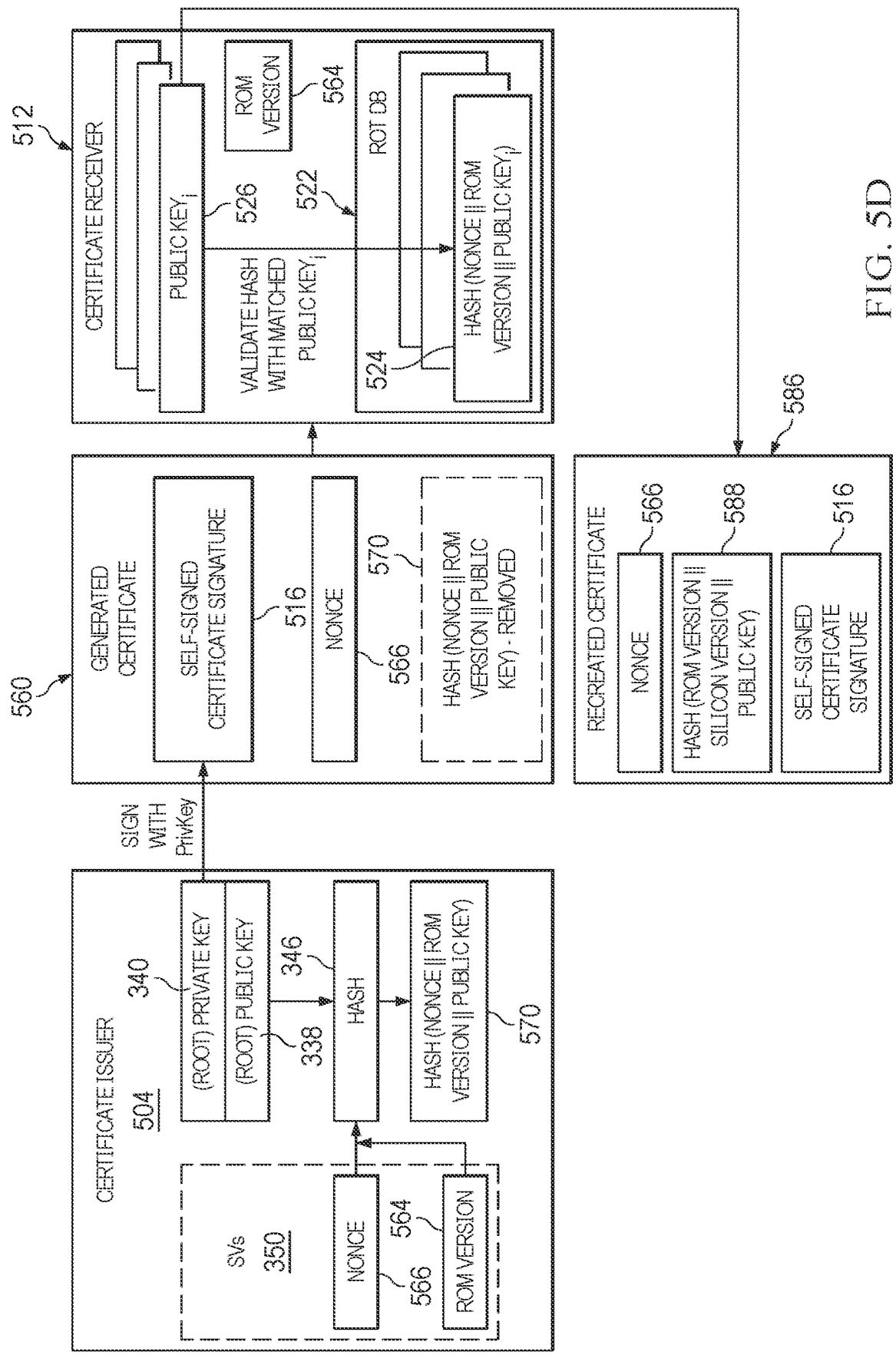

FIGS. 5A-5D illustrate different examples of the self-signed certificate 308 that is provided to the certificate receiver 312. The examples provided in FIGS. 5A-5D depict different operations for determining the payload 306. For simplification of explanation, FIGS. 3 and 5A-5D employ the same reference numbers to denote the same structures. FIGS. 5B-5D provide examples of multiple protection levels for a self-signed certificate, where the certificate issuer 504 can adapt the protection level without any code (e.g., software) modification. Each possible HMD value of the combination of potential HMD values map to a respective protection level.

More particularly, FIG. 5A illustrates a certificate issuer 504 (e.g., the certificate issuer 304 of FIG. 3) that generates a first example of a generated certificate 508 (e.g., the self-signed certificate 308 of FIG. 3) that is provided to a certificate receiver 512 (e.g., the certificate receiver 312 of FIG. 3).

In the example illustrated in FIG. 5A, the hash function 346 is applied to the public key 338 to provide a key value 520 that is a digest of the public key. The key value 520 is employed to generate a self-signed certificate signature 516 (e.g., a digital signature, namely the signature 362) that is signed with the private key 340 of the certificate issuer 504. The self-signed certificate signature 516 is generated while the key value 520 is included in a payload of the generated certificate 508. In response to generating the self-signed certificate signature 516, the key value 520 is removed from the generated certificate 508 (as indicated by the dashed line). Thus, FIG. 5A illustrates a basic example in which the public key 338 or the key value 520 (a digest of the public key 338) is hidden.

Additionally, FIG. 5B illustrates the certificate issuer 504 (e.g., the certificate issuer 304 of FIG. 3) that generates a second example of a generated certificate 528 (e.g., the self-signed certificate 308 of FIG. 3) with a nonce value 532 that implements a second value that is provided to the certificate receiver 512 (e.g., the certificate receiver 312 of FIG. 3). FIG. 5B illustrates a certificate extension HMD, where the HMD is indicated on the generated certificate 528.

More particularly, the certificate issuer 504 generates a key value 536 that is a digest of a concatenation of the public key 338 and the nonce value 532. The generated certificate 528 includes a self-signed certificate signature 516 (e.g., the signature 362) that is signed with the private key 340 of the certificate issuer 504. The self-signed certificate signature 516 is generated while the key value 536 is included in a payload of the generated certificate 528. In response to generating the self-signed certificate signature 516, the key value 536 is removed from the generated certificate 528 (as indicated by the dashed line). Additionally, to enable authentication, the nonce value 532 is included in the payload of the generated certificate 528, as a recovery hint.

Further, FIG. 5C illustrates the certificate issuer 504 (e.g., the certificate issuer 304 of FIG. 3) that generates a third example of a generated certificate 540 (e.g., the self-signed certificate 308 of FIG. 3) using second values 350 that include an indication of a ROM version and a silicon version 544 (e.g., the ROM version 366 and the silicon version 368) of the certificate receiver 512 and the public key 338 to generate a key value 548.

More particularly, the certificate issuer 504 generates the key value 548 which is a digest of the concatenation of the ROM version, silicon version 544 and the public key 338. The generated certificate 540 includes a self-signed certificate signature 516 (e.g., the signature 362) that is signed with the private key 340 of the certificate issuer 504. The self-signed certificate signature 516 is generated while the key value 548 is included in a payload of the generated certificate 540. In response to generating the self-signed certificate signature 516, the key value 548 is removed from the generated certificate 540 (as indicated by the dashed line). Thus, FIG. 5C illustrates the certificate issuer 504 generating HMD values without indicating the HMD values on the certificate 540.

Still further, FIG. 5D illustrates the certificate issuer 504 (e.g., the certificate issuer 304 of FIG. 3) that generates a fourth example of a generated certificate 560 (e.g., the self-signed certificate 308 of FIG. 3) using a concatenation of second values 350 that include a ROM version 564 of the certificate receiver 512 and a nonce value 566 (e.g., the ROM version 366 and the silicon version 368) and the public key 338 to form a key value 570. FIG. 5D illustrates a combination of the techniques depicted in FIGS. 5B and 5C.

More particularly, the certificate issuer 504 generates the key value 570 (e.g., a digest of the concatenation of the ROM version 564 of the certificate receiver 512 and the nonce value 566). The generated certificate 560 includes a self-signed certificate signature 516 (e.g., the signature 362) that is signed with the private key 340 of the certificate issuer 504. The self-signed certificate signature 516 is generated while the key value 570 is included in a payload of the generated certificate 528. In response to generating the self-signed certificate signature 516, the key value 570 is removed from the generated certificate 508 (as indicated by the dashed line). Additionally, to enable authentication of the generated certificate 560, the generated certificate 560 also includes the nonce value 566 (e.g., as a recovery hint).

Referring back to FIG. 3, in some examples, the certificate receiver 312 includes a public key database 370 that stores K number of key values 372, where K is an integer greater than or equal to one. The K number of key values 372 includes an index number that identifies a specific key value 372. Each of the K number of key values 372 has a corresponding public key 376 stored on the memory 318 of the certificate receiver 312, such that there are also K number of public keys 376. Stated differently, a given one of the K number of the key values 372 has a corresponding public key 376 stored on the certificate receiver 312 (e.g., stored in the memory 318 and/or the public key database 370). In some examples, the K number of public keys 376 are preloaded on the certificate receiver 312 in a secure environment. Additionally, in some examples, the key values 372 of the public key database 370 are also preloaded on the certificate receiver 312 in a secure environment.

In some examples, the certificate authenticator 369 populates the public key database 370 with the key values 372 using the corresponding public key 376 and a hash function 380. In some examples, the key values 372 are generated by the certificate authenticator 369 on the fly on an as-needed basis. In examples where the key values 372 are generated by the certificate authenticator 369 based on a recovery hint (e.g., the recovery hint 414 of FIG. 4D) that specifies information, such as nonce value(s), an order of concatenation, HMD indicators, etc.

Figure 6A:
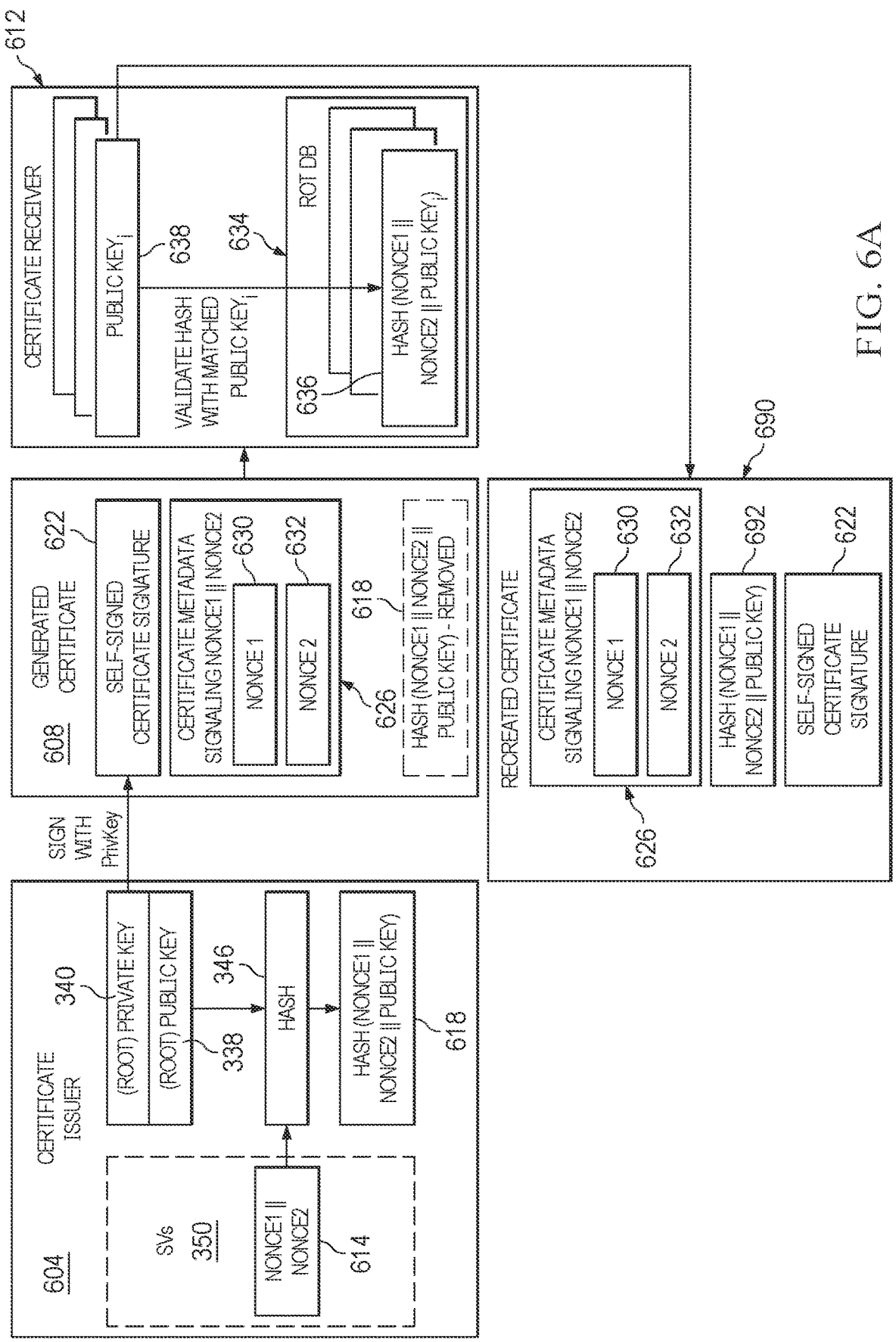
FIGS. 6A-6C illustrate examples of generated and recreated self-signed certificates that include metadata signaling.
Figure 6B:
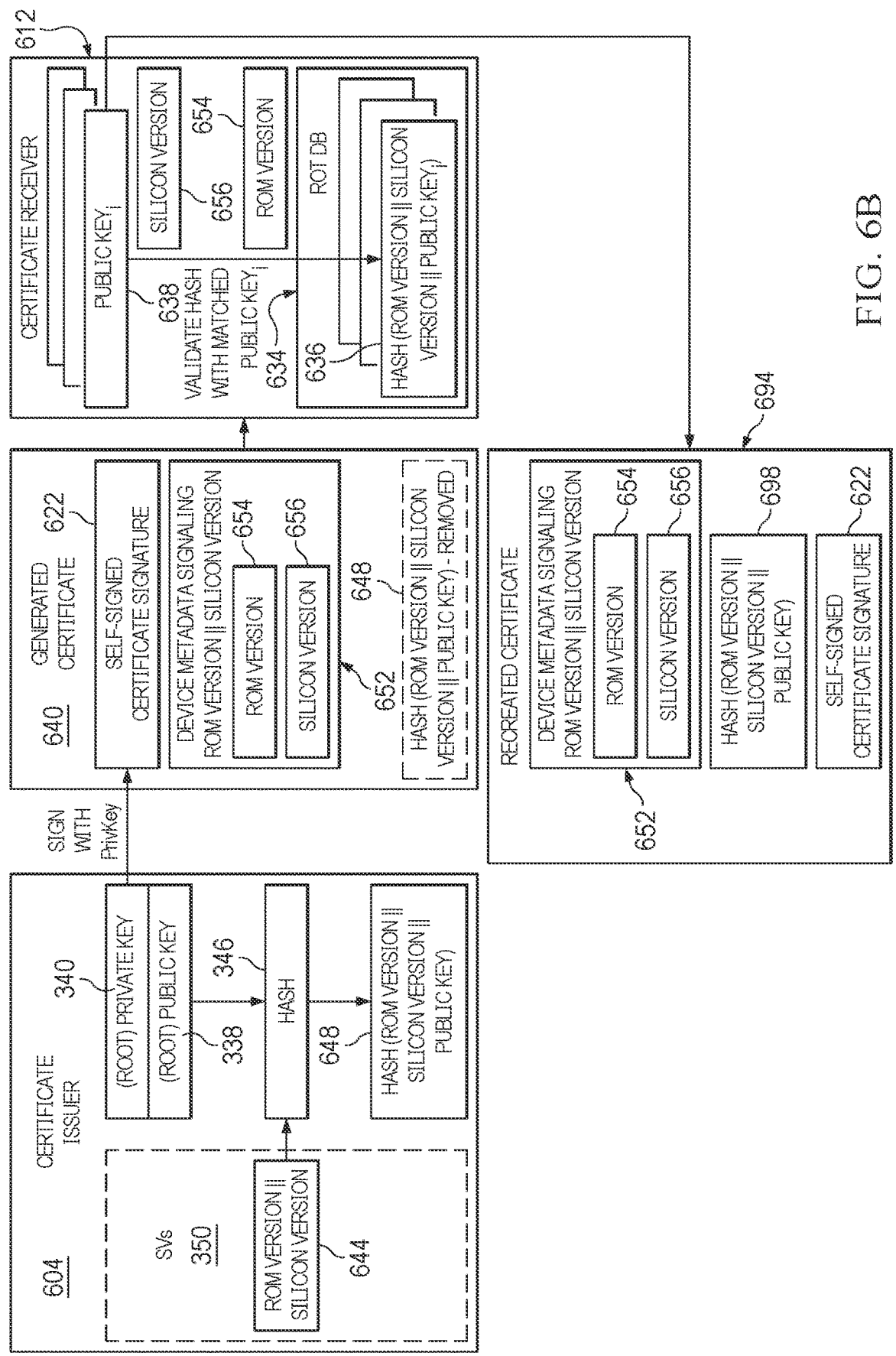
Figure 6C:
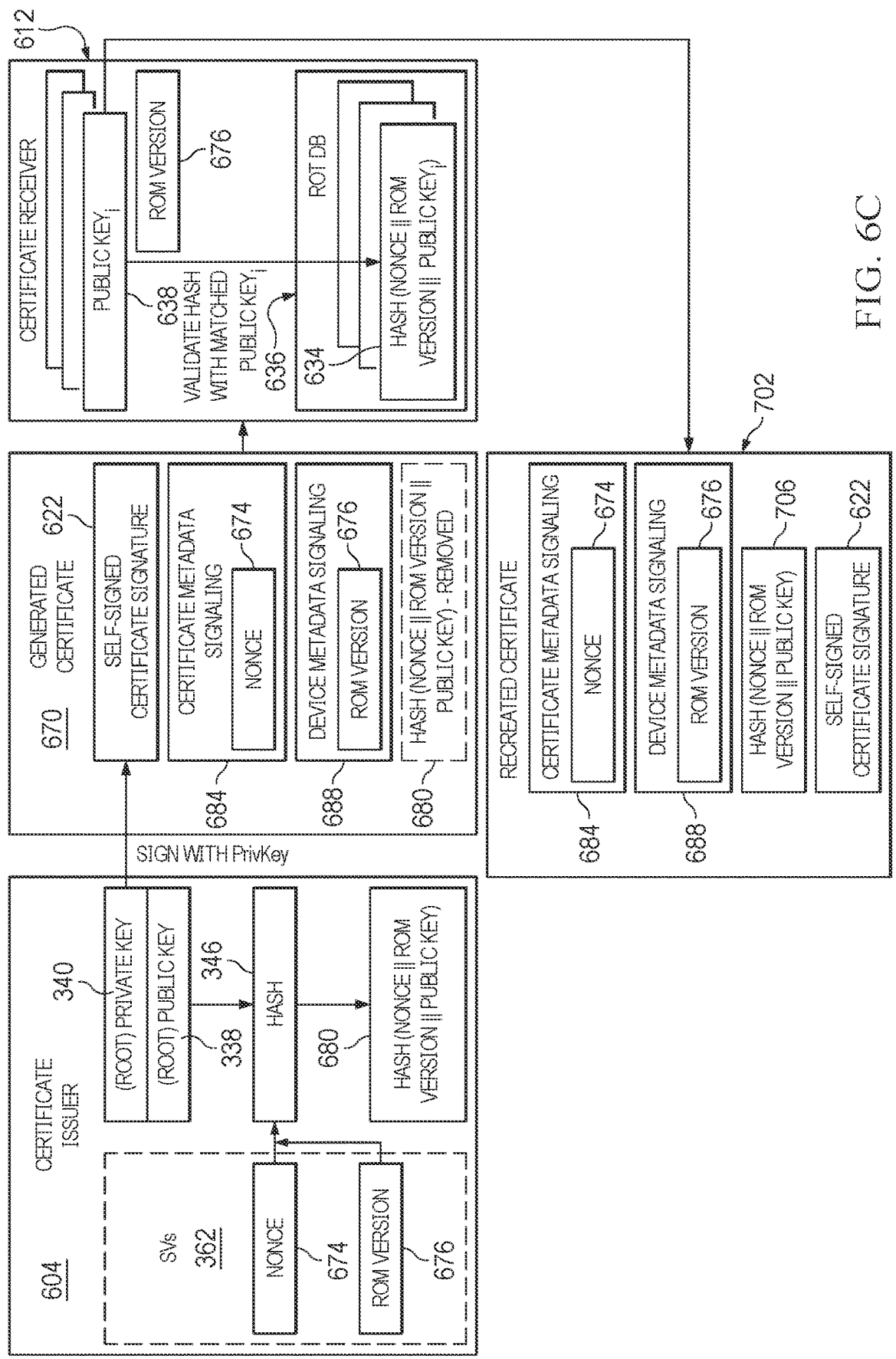

FIGS. 6A-6C illustrate different examples of the self-signed certificate 308 that is provided to the certificate receiver 312. The examples provided in FIGS. 6A-6C depict different operations for determining the signature 362, a self-signed certificate signature. For simplification of explanation, FIGS. 3 and 6A-6C employ the same reference numbers to denote the same structures. In FIGS. 6A-6C, a certificate issuer 604 generates the certificate metadata signaling 626, 652, 684, and/or 688 using a "cookbook" or technique, which can be employed as a recovery hint (e.g., the recovery hint 414 of FIG. 4D) or as part the recovery hint. This cookbook can include one or more of the HMD fields, HMD generation function, and the order of concatenation (e.g., when more than one values are concatenated with the public key 338).

More particularly, FIG. 6A illustrates a certificate issuer 604 (e.g., the certificate issuer 304 of FIG. 3) that generates a fifth example of a generated certificate 608 (e.g., the self-signed certificate 308 of FIG. 3) that is provided to a certificate receiver 612 (e.g., the certificate receiver 312 of FIG. 3).

In the example illustrated in FIG. 6A, the hash function 346 outputs a digest for key combination formed of a concatenation the public key 338 with second values 350, namely, a first nonce value and a second nonce value 614 to provide a key value 618. That is, the key value 618 is employed to implement the key value 352. The generated certificate 608 includes a self-signed certificate signature 622 (e.g., a digital signature) that is signed with the private key 340 of the certificate issuer 604. In response to generating the self-signed certificate signature 622, the key value 618 is removed from the generated certificate 608 (as indicated by the dashed line).

Additionally, to facilitate authentication of the generated certificate 608, the generated certificate 608 includes certificate metadata signaling 626 having the first nonce value 630, the second nonce value 632, along with data indicating that the key value 618 was generated with the concatenation of the first nonce value 630 and the second nonce value 632. Accordingly, the certificate metadata signaling 626 enables the certificate receiver 612 to authenticate the generated certificate 608.

Further, FIG. 6B illustrates a certificate issuer 604 (e.g., the certificate issuer 304 of FIG. 3) that generates a sixth example of a generated certificate 640 (e.g., the self-signed certificate 308 of FIG. 3) that is provided to a certificate receiver 612 (e.g., the certificate receiver 312 of FIG. 3).

In the example illustrated in FIG. 6B, the hash function 346 provides a digest of a key combination formed of a concatenation of the public key 338, and second values 350, namely a concatenation of a ROM version and a silicon version 644 to provide a key value 648. That is, the key value 648 is employed to implement the key value 352. The generated certificate 640 includes a self-signed certificate signature 622 (e.g., the signature 362) that is signed with the private key 340 of the certificate issuer 604. The self-signed certificate signature 622 is generated while the key value 648 is included in a payload of the generated certificate 640. In response to generating the self-signed certificate signature 622, the key value 648 is removed from the generated certificate 640 (as indicated by the dashed line).

Additionally, to facilitate authentication of the generated certificate 640, the generated certificate 640 includes device metadata signaling 652 that includes data indicating that the ROM version 654 and the silicon version 656 stored on the certificate receiver 612 were used to generate the key value 648. However, the values of the ROM version 654 and the silicon version 656 (stored on the certificate receiver 612) are omitted from the generated certificate 640 for security. Accordingly, the device metadata signaling 652 enables the certificate receiver 612 to authenticate the generated certificate 640.

Also, FIG. 6C illustrates the certificate issuer 604 (e.g., the certificate issuer 304 of FIG. 3) that generates a seventh example of a generated certificate 670 (e.g., the self-signed certificate 308 of FIG. 3) that is provided to a certificate receiver 612 (e.g., the certificate receiver 312 of FIG. 3).

In the example illustrated in FIG. 6C, the hash function 346 outputs a digest of a key combination formed as a concatenation of the public key 338, a ROM version 676 and a nonce value 674 to provide a key value 680. That is, the key value 680 is employed to implement the key value 352. The generated certificate 670 includes a self-signed certificate signature 622 (e.g., the signature 362) that is signed with the private key 340 of the certificate issuer 604. The self-signed certificate signature 622 is generated while the key value 680 is included in a payload of the generated certificate 670. Responsive to generating the self-signed certificate signature 622, the key value 680 is removed from the generated certificate 670 (as indicated by the dashed line).

Additionally, to facilitate authentication of the generated certificate 670, the generated certificate 670 includes certificate metadata signaling 684 that includes the nonce value 674 employed to generate the key value 680. The generated certificate 670 also includes device metadata signaling 688 with data indicating that the ROM version 676 stored on the certificate receiver 612, was employed to generate the key value 680. However, the value of the ROM version 676 (stored on the certificate receiver 612) is omitted from the generated certificate 670 for security. Accordingly, the certificate metadata signaling 684 and the device metadata signaling 688 enables the certificate receiver 612 to authenticate the generated certificate 670.

The particular public certificate example (e.g., the first-seventh examples of the self-signed certificate illustrated in FIGS. 5A-5D and 6A-6C) selected for employment is based on the security needed for the specific implementation. In particular, an increase in the number of and types of values (e.g., nonce value and/or a hashed metadata value) concatenated with the public key 338 to form a corresponding key value increases the security of the resultant self-signed certificate.

Responsive to receiving the self-signed certificate 308, the certificate authenticator 369 extracts the signature 362 from the self-signed certificate 308. In some examples, the certificate authenticator 369 extracts the public key validation section of the self-signed certificate that includes the signature 362. Additionally, the certificate authenticator 369 selects one of the K number of key values 372 (e.g., KEY VALUE$_1$), which is referred to as a first key value, from the public key database 148 and selects a corresponding public key 156 (e.g., PUBLIC KEY$_1$). Referring to FIGS. 5A-5D, the certificate receiver 512 includes a root of trust (ROT) database 522 that is employed to implement the public key database 370 of FIG. 3. The ROT database 522 includes K number of key values 524 (e.g., HASH (PUBLIC KEY$_i$) in FIG. 5A, HASH (NONCE∥PUBLIC KEY$_i$) in FIG. 5B, HASH (ROM VERSION∥SILICON VERSION∥PUBLIC KEY$_i$) in FIG. 5C and HASH (NONCE∥ROM VERSION-∥PUBLIC KEY$_i$) in FIG. 5D) and K number of corresponding public keys 526 (e.g., PUBLIC KEY$_i$). In some examples, the ROT database 522 is populated by the certificate receiver 512 based on preprogrammed rules (e.g., a-priori information). In other examples, the ROT database 522 is preloaded on the certificate receiver 512. Referring to FIGS. 6A-6C, a certificate receiver 612 includes a root of trust (ROT) database 634 that is employed to implement the public key database 370 of FIG. 3. The ROT database 634 includes K number of key values 636 (e.g., HASH (NONCE1∥NONCE2∥PUBLIC KEY$_i$) in FIG. 6A, HASH (ROM version∥Silicon Version∥PUBLIC KEY$_i$) in FIG. 6B, HASH (NONCE∥ROM VERSION∥PUBLIC KEY$_i$) in FIG. 6C. The certificate receiver 612 also includes K number of corresponding public keys 638 (e.g., PUBLIC KEY$_i$).

In the examples provided in FIGS. 6A-6C, the ROT database 634 is populated by the certificate receiver 612 based on the metadata signaling (e.g., a recovery hint) included in the corresponding self-signed certificate. More particularly, in the fifth example of the generated certificate 608 illustrated in FIG. 6A, the certificate receiver 612 populates the RoT database 634 based on the certificate metadata signaling 626 that includes the first nonce value 630 and the second nonce value 632 and an order of concatenation. In the sixth example of the generated certificate 640 illustrated in FIG. 6B, the certificate receiver 612 employs the device metadata signaling 652 (e.g., the recovery hint) to determine that the key value 648 is based on the ROM version 654 and the silicon version 656 of the certificate receiver 612. In the seventh example of the generated certificate 670 of FIG. 6C, the certificate receiver 612 employs the signaling 684 and the device metadata signaling 688 (e.g., the recovery hint) to determine that the key value 636 for the generated certificate 670 includes the nonce value 674 and the ROM version 676 of the certificate receiver 612 and an order of concatenation.

Referring back to FIG. 3, in some examples, responsive to the selected key value 372, the certificate authenticator 369 adds (augments) the payload of the self-signed certificate 308 with the selected key value 372 (e.g., HASH (KEY VALUE$_1$)) to provide an augmented payload for the self-signed certificate 308. In other examples, this operation is omitted. The certificate authenticator 369 employs a hash function 380 to hash the augmented payload for the self-signed certificate 308 to provide a digest of the augmented payload. The hash function 380 has the same function as the hash function 358 of the certificate issuer 304. In some examples, the algorithm for the hash function 380 is specified in the payload of the self-signed certificate 308. Additionally, the certificate authenticator 369 inputs the digest of the augmented payload, the selected public key 376 and the signature 362 into a signature authenticator 384 to verify the signature 362 of the certificate issuer 304. The signature authenticator 384 attempts to verify the signature 362 using the augmented payload and the selected public key 376. Additionally, in examples where the key value 352 employed to generate the self-signed certificate 108 is a signed digest, the certificate authenticator 369 also verifies a signature of the key value 352 using the selected public key 376.

If the signature of the certificate issuer 304 is authenticated (validated) with the verification, the certificate authenticator 369 determines that the selected public key 376 (e.g., PUBLIC KEY$_1$) is the public key 376 for the certificate issuer 304, and the self-signed certificate 308 is authenticated. Additionally, responsive to authenticating the signature 362, the selected key value 372 (labeled as KEY VALUE$_x$) is added to a public key field of the self-signed certificate 308. Accordingly, through this process, the certificate authenticator 369 can provide a recovered certificate 388 that includes a payload 392 with the selected key value 372 of the recovered certificate 388. In some examples, the recovered certificate 388 includes metadata signaling, such as in situations where the metadata signaling is signed by the certificate issuer 304 and authenticable. In other examples, the metadata signaling is removed or otherwise omitted from the recovered certificate 388, such as situations where the metadata signaling is not signed by the certificate issuer 304.

If the verification of the signature is unsuccessful (e.g., the signature 362 is not validated), the certificate authenticator 369 refrains from using the selected public key 376 as the public key 338 for the certificate issuer 304, and selects (and generates) a next key value 372 (e.g., HASH (KEY VALUE$_2$)) and a corresponding public key 376 (e.g., the PUBLIC KEY$_2$) and the certificate authenticator 369 regenerates the augmented payload and re-verifies the signature 362 using the next public key 376. This process is repeated until the certificate authenticator 369 identifies the public key 338 for the certificate issuer 304 or until the signature 362 is not verified with any of the K number of public keys 376 (e.g., the K number of public keys 376 has been exhausted). In this situation, the verification of the signature 362 has failed, and the certificate authenticator 369 does not trust the authenticity of the self-signed certificate 308.

FIGS. 5A-5D include examples of recreated certificates. In particular, in the example illustrated in FIG. 5A, the certificate receiver 512 generates a first example of a recreated certificate 574 corresponding to the first example of the generated certificate 508. The recreated certificate 574 includes the self-signed certificate signature 516. Additionally, the recreated certificate 574 includes a key value 576 that is employable to identify a corresponding public key 526. FIG. 5B illustrates a second example of a recreated certificate 578 that corresponds to the second example of the generated certificate 528. The recreated certificate 578 includes the self-signed certificate signature 516, and the nonce value 532. Additionally, the recreated certificate 578 includes a key value 580 that can be generated by the certificate receiver 512. The key value 580 allows identification of the corresponding public key 526. FIG. 5C illustrates a third example of a recreated certificate 582 that corresponds to the third example of the generated certificate 540. The recreated certificate 582 includes the self-signed certificate signature 516. Additionally, the recreated certificate 578 includes a key value 584 that can be generated by the certificate receiver 512. FIG. 5D illustrates a fourth example of a recreated certificate 586 that corresponds to the fourth example of the generated certificate 560. The recreated certificate 586 includes the self-signed certificate signature 516. Additionally, the recreated certificate 586 includes a key value 588 that can be generated by the certificate receiver 512.

FIGS. 6A-6C illustrate additional examples of recreated certificates. In particular, in the example illustrated in FIG. 6A, the certificate receiver 612 generates a fifth example of a recreated certificate 690 corresponding to the fifth example of the generated certificate 608. The recreated certificate 690 includes the self-signed certificate signature 622. The recreated certificate 690 includes the first nonce value 630 and the second nonce value 632, as well as the metadata signaling 626 (e.g., recovery hint). Additionally, the recreated certificate 690 includes a key value 692 that is employable to identify a corresponding public key 638. The key value 692 is generated using the metadata signaling 626, which can include an order of concatenation to form a key combination, which in turn is employed to generate the key value 692.

In the example illustrated in FIG. 6B, the certificate receiver 612 generates a sixth example of a recreated certificate 694 corresponding to the sixth example of the generated certificate 640. The recreated certificate 694 includes the self-signed certificate signature 622. The recreated certificate 694 includes the metadata signaling 626 (e.g., recovery hint) that points to the ROM version 654 and the silicon version 656 of the certificate receiver 612. Additionally, the recreated certificate 694 includes a key value 698 that is employable to identify a corresponding public key 638. The key value 698 is generated using the metadata signaling 652, which can include an order of concatenation to form a key combination, which in turn is employed to generate the key value 698.

In the example illustrated in FIG. 6C, the certificate receiver 612 generates a seventh example of a recreated certificate 702 corresponding to the seventh example of the generated certificate 640. The recreated certificate 702 includes the self-signed certificate signature 622. The recreated certificate 702 include the metadata signaling 684 that includes the nonce value 674 and the device metadata signaling 688 (e.g., recovery hint) that points to the ROM version 676 of the certificate receiver 612. Additionally, the recreated certificate 702 includes a key value 706 that is employable to identify a corresponding public key 638. The key value 706 is generated using the certificate metadata signaling 684 and the device metadata signaling 688, which can include an order of concatenation to form a key combination, which in turn is employed to generate the key value 706. As noted with respect to FIG. 3, in various examples, the metadata signaling (e.g., metadata signaling 626 of FIG. 6A, the metadata signaling 652 of FIG. 6B, the certificate metadata signaling 684 and the device metadata signaling 688 of FIG. 6C) may be removed or otherwise omitted from the recreated certificates, namely the recreated certificate 690 of FIG. 6A, the recreated certificate 694 of FIG. 6B and the recreated certificate 702 of FIG. 6C, such as in situations where the metadata signaling is unsigned by the certificate issuer 604. Alternatively, the metadata signaling can be included in the recreated certificate in situations where the metadata signaling is signed by the certificate issuer.

Referring back to FIG. 3, responsive to the identification of the public key 338 of the certificate issuer 304, the certificate receiver 312 can employ the self-signed certificate 308 to authenticate data encrypted and/or signed with the private key 340 of the certificate issuer 304. Additionally, the unauthorized entity 356 would be unable to derive the public key 338 and/or the private key 340 of the certificate issuer 304, obviating the need for the certificate issuer 304 to send newly generated public keys to the certificate receiver 312. Moreover, both the certificate issuer 304 and the certificate receiver 312 are assured of the other's identity because the public key 338 and/or the key value 352 of the certificate issuer 304 are not transmitted over the network 330 (an unsecured network). In this manner, the unauthorized entity 356 monitoring communications between the certificate issuer 304 and the certificate receiver 312 would be unable to derive the public key 338 and/or the private key 340 of the certificate issuer 304. In this manner, the self-signed certificate 308 provides multiple protection levels based on the HMD signaling and/or configuration. For example, as illustrated in FIGS. 6A-6C, the selected HMD value set determines an order of concatenation needed to form a key combination, which in turn is used to provide a key value 372. Additionally, the different protection levels are adaptable without the need for code modification. In fact, the HMD signaling and configuration enable a combination of a potential HMD map to a protection level.

Accordingly, the system 300 enables the self-signed certificate 308 to be authenticated and used for communication even though the self-signed certificate 308 omits the public key 338 and possibly omits the key value 352 for the certificate issuer 304. Accordingly, the procedure described for generating the self-signed certificate 308 ensures secure communications even in situations where an advanced computer (e.g., a quantum computer) employed by the unauthorized entity 356 attempts to derive the public key 338. In this situation, this unauthorized entity 356 would not have the public key 338 or the key value 352. Accordingly, the system 300 increases security of communications between the certificate issuer 304 and the certificate receiver 312. In particular, the system 300 enables varying levels of protection (as illustrated in FIGS. 5A-5D and FIGS. 6A-6C) through varying levels of metadata protection/signaling and concatenation order for a hash function. For instance, as described, inclusion of HMD values enables a greater level of protection. As an example, efforts to gain unauthorized access would need to be repeated for each different HMD value. Additionally, in various examples, in the system 300, both the certificate issuer 304 and the certificate receiver 312 provide the HMD values.

As explained, the system 300 does not have additional data present on the self-signed certificate 308, although this data is still signed. This additional data includes device level data and the public key 338 of the certificate issuer 304. Inclusion of metadata signaling for the authentication of the certificate issuer 304 provides protection by including dedicated extensions and/or new fields for the structure of the self-signed certificate 308. Additionally, as explained, the concatenation order of elements employed to provide the key value 352 also provides protection. Further still, the system 300 prevents an attack surface for quantum computing (QC) attacks because the public key 338 is not on the self-signed certificate 308 and resolving hash conflicts are considered QC safe. Still further, the system 300 has a relatively low complexity (e.g., applicable at 10% overhead and can be implemented with a microcontroller (MCU)) because the operations reuse existing methods/algorithms and no new hardware or new crypto infrastructure is needed for implementation.

Figure 7:
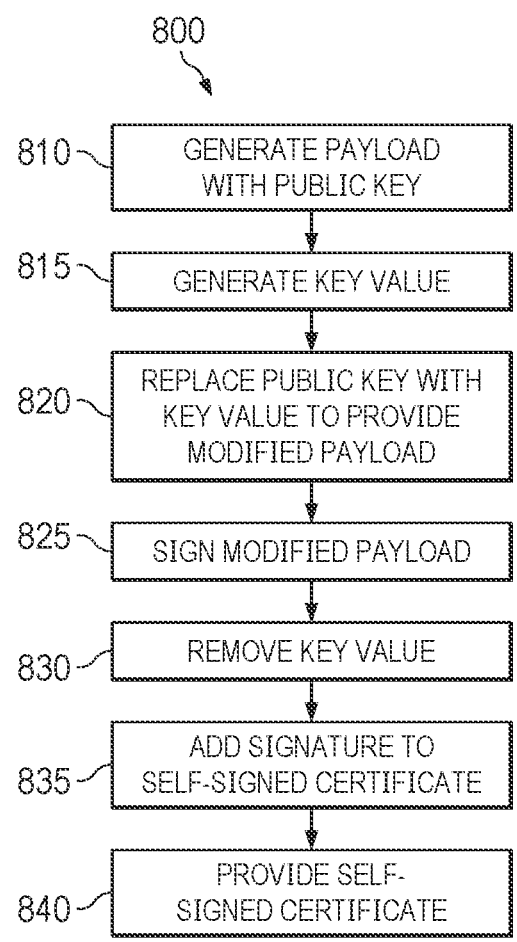
FIG. 7 illustrates a flowchart of an example method for generating a self-signed certificate.

FIG. 7 illustrates an example method 800 for generating a self-signed certificate, such as the self-signed certificate 108 of FIG. 1. In some examples, the method 800 is implemented with the certificate issuer 104 of FIG. 1 and/or the certificate issuer 304 of FIG. 3. At 810, a certificate generator (e.g., the certificate generator 124 of FIG. 1) generates a payload (e.g., the payload 114 of FIG. 1) for a self-signed certificate (e.g., the self-signed certificate 108 of FIG. 1) that may include a public key (e.g., the public key 116) for the certificate issuer. In some examples, the self-signed certificate can include a key value field (e.g., a blank field) instead of the public key field.

At 815, a key value generator (e.g., the key value generator 122 of FIG. 1) generates a key value (e.g., the key value 132 of FIG. 1). The key value is based at least on the public key of the certificate issuer. The key value represents a secret element based on the public key that is non-feasible to decode without prior knowledge that is not exposed to any entity other than the certificate issuer and the certificate receiver. In some examples, the key value is based on a key combination that is a concatenation of the public key and a second value (or multiple second values).

At 820, the certificate generator replaces data in a public key field or the key value field (if included) of the payload with the key value to provide a modified payload. In other examples, the payload of the self-signed certificate is generated without a public key field, or the key value field is left blank or removed. At 825, the certificate generator signs the payload with a private key of the certificate issuer to provide a signature of the modified payload. To sign the payload, the certificate generator employs a hash function (e.g., the hash function 138 of FIG. 1) to provide a digest of the payload. Additionally, the certificate generator employs a signer (e.g., the signer 140 of FIG. 1) to digitally sign the digest of the payload with a private key (e.g., the private key 120 of FIG. 1) of the certificate issuer to provide the signature. At 830, in some examples, in response to the signing, the certificate generator removes the key value from the payload of the self-signed certificate. As described herein, the certificate generator may instead replace the key value in the payload with replacement data such as a nonce value, a blank value, and/or a recovery hint. At 835, the signature is added to the self-signed certificate. At 840, the self-signed certificate is provided to another party, such as a certificate receiver (e.g., the certificate receiver 112 of FIG. 1) for authentication.

Figure 8:
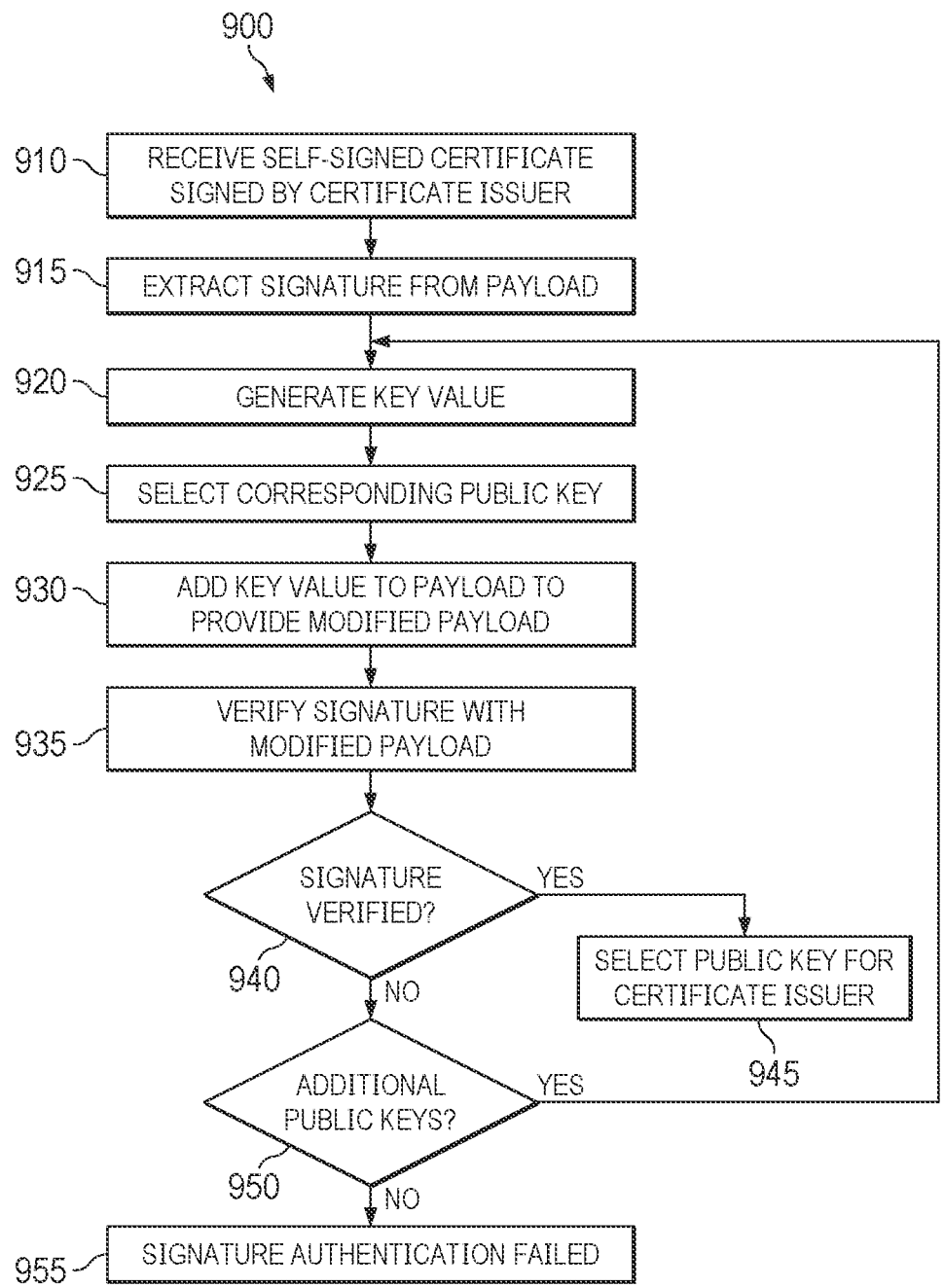
FIG. 8 illustrates a flowchart of an example method for authenticating a self-signed certificate.

FIG. 8 illustrates an example method 900 for authenticating a self-signed certificate, such as the self-signed certificate 108 of FIG. 1. In some examples, the method 900 is implemented with a certificate receiver (e.g., the certificate receiver 112 of FIG. 1 and/or the certificate receiver 312 of FIG. 3). At 910, the certificate receiver receives the self-signed certificate from a network, such as the Internet or from a physical interface of a device. The self-signed certificate is signed by a certificate issuer (the certificate issuer 104 of FIG. 1). At 915, a certificate authenticator (e.g., the certificate authenticator 144 of FIG. 1) of the certificate receiver extracts a signature (e.g., the signature 142 of FIG. 1) from the self-signed certificate. At 920, the certificate authenticator generates a key value. In some examples, to generate the key value, the certificate receiver selects a key value (e.g., a key value 152 of FIG. 1) from a public key database (e.g., the public key database 148 of FIG. 1). Additionally or alternatively, the certificate authenticator generates the key value based on a recovery hint (e.g., metadata signaling, such as certificate metadata signaling and/or hardware metadata signaling) embedded in the self-signed certificate. At 925, the certificate authenticator selects the corresponding public key, which is referred to as a selected public key.

At 930, the certificate authenticator of the certificate receiver adds the selected key value to the payload of the self-signed certificate to provide a modified payload (e.g., an augmented payload). At 935, the certificate receiver employs the selected public key and the modified payload to verify the signature extracted from the self-signed certificate.

At 940, the certificate receiver determines whether the signature is authenticated by the verification. If the determination at 940 is positive (e.g., YES), the method 900 proceeds to 945. If the determination at 940 is negative, the method 900 proceeds to 950. At 945, the certificate receiver selects the selected public key as the public key for the certificate issuer. Conversely, at 950, the certificate receiver makes a determination as to whether additional public keys are available to attempting to verify the signature of the self-signed certificate. If the determination at 950 is positive (e.g., YES), the method 900 returns to 920, and because the determination at 940 is negative, the certificate receiver is inhibited from selecting the selected public key as the public key for the certificate issuer, and a next key value is generated at 920. Accordingly, the operations of 920-940 are executed until the certificate authenticator of the certificate receiver authenticates the signature of the certificate issuer. Conversely, if the determination at 950 is negative (e.g., NO), indicating that every public key stored at the certificate receiver has been employed to in an attempt to authenticate the signature of the self-signed certificate, and the signature is still unverified (e.g., a failed verification state), the method 900 proceeds to 955. At 955 the certificate receiver determines that the signature of the self-signed certificate has failed authentication. Thus, the certificate receiver does not trust the authenticity of the self-signed certificate.

Modifications are possible in the described embodiments, and other embodiments are possible, within the scope of the claims.

What is claimed is:

1. A non-transitory machine-readable medium including machine-readable instructions comprising:
   a key value generator, the machine-readable instructions for the key value generator being executable by a processor core to perform operations comprising:
      concatenating a public key of a certificate issuer with a second value to form a key combination; and
      generating a digest of the key combination to provide a key value; and
   a certificate generator, the machine-readable instructions for the certificate generator being executable by the processor core to perform operations comprising:
      providing a payload of a self-signed certificate for the certificate issuer that includes the public key of the certificate issuer;
      replacing data in a public key field of the payload of the self-signed certificate with the key value to provide a modified payload;
      signing the modified payload with a private key of the certificate issuer to provide a digital signature;
      removing, responsive to the signing, the key value from the modified payload of the self-signed certificate; and
      adding the digital signature to the self-signed certificate.

2. The non-transitory machine-readable medium of claim 1, wherein the generating executed by the key value generator comprises applying a hash function to the key combination to provide the digest of the key combination.

3. The non-transitory machine-readable medium of claim 2, wherein the generating executed by the key value generator further comprises signing the digest of the key combination with the private key of the certificate issuer to provide the key value, such that the key value comprises a signed digest of the key combination.

4. The non-transitory machine-readable medium of claim 1, wherein the second value is a nonce value, and the operations executed for the certificate generator further comprise adding the nonce value to the payload.

5. The non-transitory machine-readable medium of claim 1, wherein the key combination comprises a concatenation of the public key and hashed metadata (HMD) characterizing an immutable feature of an external device, and the HMD is known to the certificate generator and a certificate authenticator executing on the external device.

6. The non-transitory machine-readable medium of claim 5, wherein the HMD characterizes a version of read only memory of the external device.

7. The non-transitory machine-readable medium of claim 6, wherein the HMD characterizes a concatenation of the version of read only memory and a version of silicon of the external device.

8. The non-transitory machine-readable medium of claim 5, wherein the HMD characterizes a concatenation of a version of read only memory of the external device and a nonce value, and wherein the operations executed for the certificate generator further comprise adding the nonce value to the payload of the self-signed certificate.

9. The non-transitory machine-readable medium of claim 5, wherein the payload comprises certificate metadata signaling and/or device metadata signaling that specifies an algorithm employed for selecting the key combination.

10. The non-transitory machine-readable medium of claim 1, wherein the removing executed by the certificate generator further comprises adding a null value to the public key field of the modified payload of the self-signed certificate in place of the key value.

11. The non-transitory machine-readable medium of claim 1, wherein the removing executed by the certificate generator further comprises adding a numerical value having a same length as the key value to the public key field of the modified payload of the self-signed certificate in place of the key value.

12. The non-transitory machine-readable medium of claim 1, wherein the removing executed by the certificate generator further comprises adding a recovery hint to the public key field of the modified payload of the self-signed certificate in place of the key value, wherein the recovery hint characterizes how the key combination was formed.

13. A non-transitory machine-readable medium including machine-readable instructions comprising a certificate authenticator, the machine-readable instructions for the certificate authenticator being executable by a processor core to perform operations comprising:
  receiving a self-signed certificate that includes a signature of a certificate issuer;
  extracting, from the self-signed certificate, the signature of the certificate issuer;
  generating a key value based on a corresponding public key;
  adding the key value to a public key field of a payload of the self-signed certificate to provide a modified payload;
  verifying the signature of the certificate issuer including the modified payload using the public key; and
  selecting the public key as the public key for the certificate issuer responsive to the signature being authenticated by the verifying.

14. The non-transitory machine-readable medium of claim 13, wherein the key value is associated with the public key.

15. The non-transitory machine-readable medium of claim 13, wherein the key value is associated with a concatenation of the public key and a nonce value or the key value is associated with a concatenation of the public key and hashed metadata (HMD) characterizing an immutable feature of an external device and the HMD is known to the certificate authenticator and to a certificate generator executing on the external device.

16. The non-transitory machine-readable medium of claim 13, wherein the public key is a first public key, the key value is a first key value, the modified payload is a first modified payload, and the operations executed for the certificate authenticator further comprise:
  generating a second key value based on a corresponding second public key;
  adding the second key value to the public key field of the payload to provide a second modified payload;
  verifying the signature of the certificate issuer including the second modified payload with the second public key; and
  refraining from selecting the second public key as the public key for the certificate issuer responsive to the verifying of the signature of the certificate issuer including the second modified payload using the second public key being unsuccessful.

17. The non-transitory machine-readable medium of claim 16, wherein the generating of the first public key is responsive to the refraining.

18. The non-transitory machine-readable medium of claim 16, wherein the payload comprises certificate metadata signaling and/or device metadata signaling that specifies an algorithm employed for selecting a key combination employed to generate the first key value, and the operations executed for the certificate authenticator further comprise:
  generating the first key value stored based on the public key and data identified in the certificate metadata signaling and/or the device metadata signaling.

19. A system comprising:
  a non-transitory memory having machine-readable instructions; and
  a processor core configured to access the non-transitory memory and execute the machine-readable instructions, the machine-readable instructions comprising a certificate authenticator, the processor core executing the machine-readable instructions for the certificate authenticator to perform operations comprising:
    receiving a self-signed certificate that includes a signature of a certificate issuer;
    extracting, from a payload of the self-signed certificate, the signature of the certificate issuer;
    generating a key value based on a corresponding public key;
    adding the key value to a public key field of the payload to provide a modified payload;
    verifying the signature of the certificate issuer including the modified payload using the public key; and
    selecting the public key retrieved as the public key for the certificate issuer responsive to the signature being authenticated by the verifying.

20. The system of claim 19, wherein the public key is a first public key, the key value is a first key value, the modified payload is a first modified payload, and the operations executed for the certificate authenticator by the processor core further comprise:
  generating a second key value based on a corresponding second public key;
  adding the second key value to the public key field of the payload to provide a second modified payload;
  verifying the signature of the certificate issuer including the second modified payload using the second public key; and
  refraining from selecting the second public key as the public key for the certificate issuer responsive to the verifying of the signature of the certificate issuer including the second modified payload using the second public key being unsuccessful.

* * * * *